(12) United States Patent
Yao et al.

(10) Patent No.: US 12,327,327 B2
(45) Date of Patent: Jun. 10, 2025

(54) DEEP LEARNING BASED SINGLE FRAME SUPER RESOLUTION MICROSCOPY IMAGE PROCESSING

(71) Applicant: The Hong Kong University of Science and Technology, Hong Kong (CN)

(72) Inventors: Shuhuai Yao, Hong Kong (CN); Shengwang Du, Hong Kong (CN); Rong Chen, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 390 days.

(21) Appl. No.: 17/822,902

(22) Filed: Aug. 29, 2022

(65) Prior Publication Data

US 2023/0106383 A1 Apr. 6, 2023

Related U.S. Application Data

(60) Provisional application No. 63/252,181, filed on Oct. 5, 2021.

(51) Int. Cl.
*G06T 3/4046* (2024.01)
*G06T 3/4076* (2024.01)
*G06T 7/00* (2017.01)

(52) U.S. Cl.
CPC .......... *G06T 3/4076* (2013.01); *G06T 3/4046* (2013.01); *G06T 7/0012* (2013.01); *G06T 2207/10056* (2013.01); *G06T 2207/10064* (2013.01)

(58) Field of Classification Search
CPC ... G06T 3/4076; G06T 3/4046; G06T 7/0012; G06T 2207/10056; G06T 2207/10064; G06T 2207/30004; G06T 3/403; G06T 7/13; G06T 2207/20081;
(Continued)

(56) References Cited

U.S. PATENT DOCUMENTS

2020/0250794 A1* 8/2020 Zimmer ............... G06T 3/4069
2022/0114711 A1 4/2022 Ozcan et al.
2022/0335573 A1* 10/2022 Zhu ..................... G06T 3/4053

FOREIGN PATENT DOCUMENTS

CN 112017113 A * 12/2020 ........... G06T 3/4076
CN 112614056 A 4/2021

OTHER PUBLICATIONS

Ouyang W, Aristov A, Lelek M, et al. Deep learning massively accelerates super-resolution localization microscopy[J]. Nature biotechnology, 2018, 36(5): 460-468.
(Continued)

*Primary Examiner* — Sumati Lefkowitz
*Assistant Examiner* — Michael Adam Shariff
(74) *Attorney, Agent, or Firm* — S&F/WEHRW

(57) ABSTRACT

The present application provides methods, devices, systems and non-transitory computer readable storage media for image processing. In an aspect, there is provided a computer-implemented method of image processing, the method comprising: receiving a low resolution image of an object; generating an edge map of the low resolution image by an edge extractor; and inputting the edge map and the low resolution image to a neural network to reconstruct a super resolution image of the object, wherein the neural network is trained using a multicomponent loss function.

18 Claims, 15 Drawing Sheets

(58) Field of Classification Search
CPC .......... G06T 2207/20084; G06V 10/44; G06N 3/04; G06N 20/00; G06N 3/0475
See application file for complete search history.

(56) References Cited

OTHER PUBLICATIONS

Qiao C, Li D, Guo Y, et al. Evaluation and development of deep neural networks for image super-resolution in optical microscopy[J]. Nature Methods, 2021, 18(2): 194-202.

Wang H, Rivenson Y, Jin Y, et al. Deep learning enables cross-modality super-resolution in fluorescence microscopy[J]. Nature methods, 2019, 16(1): 103-110.

Chen J, Sasaki H, Lai H, et al. Three-dimensional residual channel attention networks denoise and sharpen fluorescence microscopy image volumes[J]. Nature Methods, 2021, 18(6): 678-687.

Weigert M, Schmidt U, Boothe T, et al. Content-aware image restoration: pushing the limits of fluorescence microscopy[J]. Nature methods, 2018, 15(12): 1090-1097.

* cited by examiner

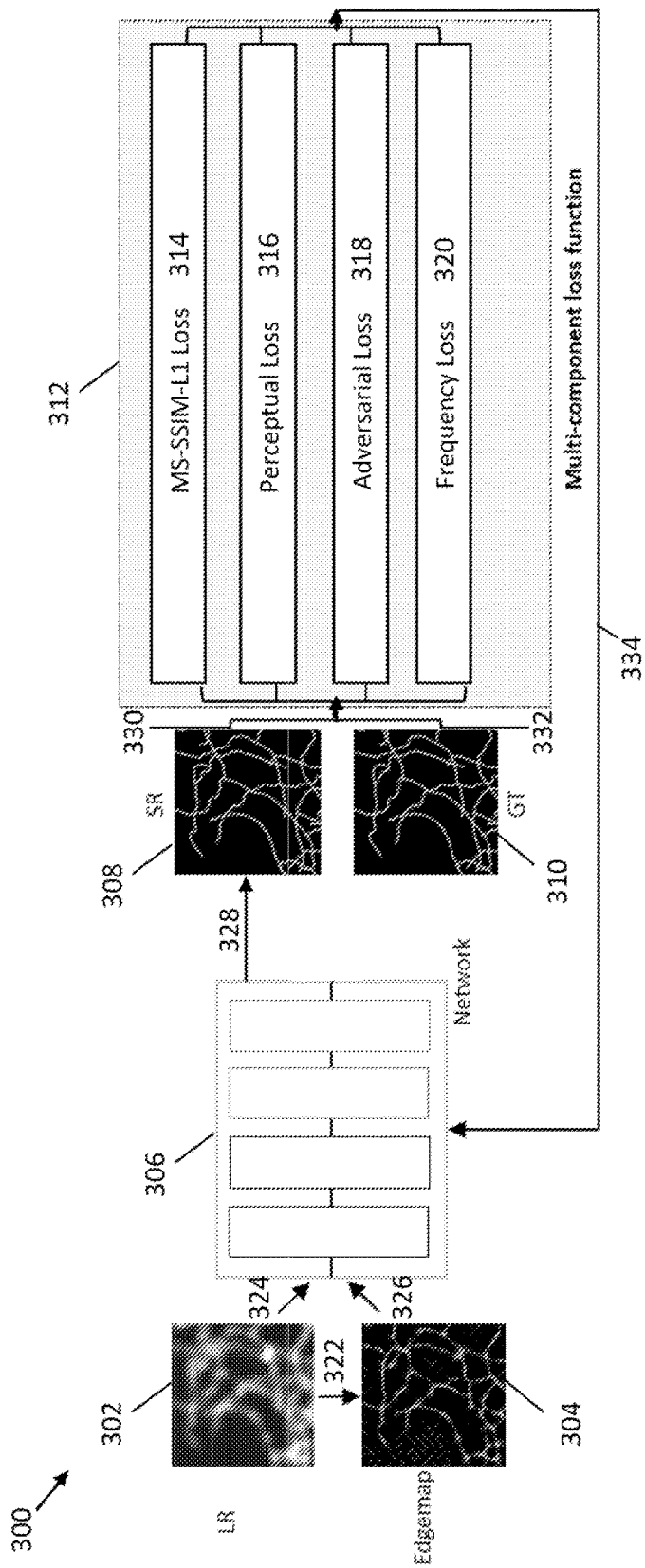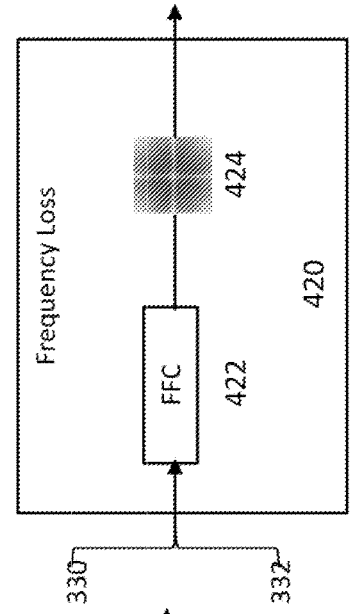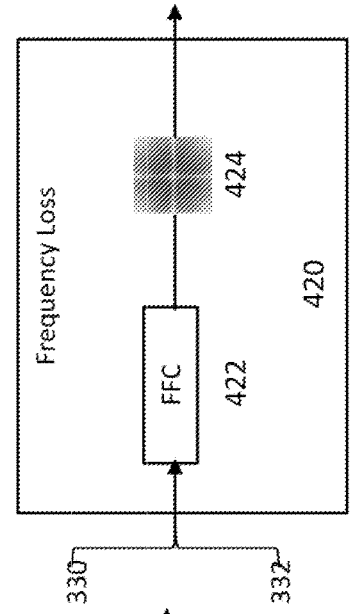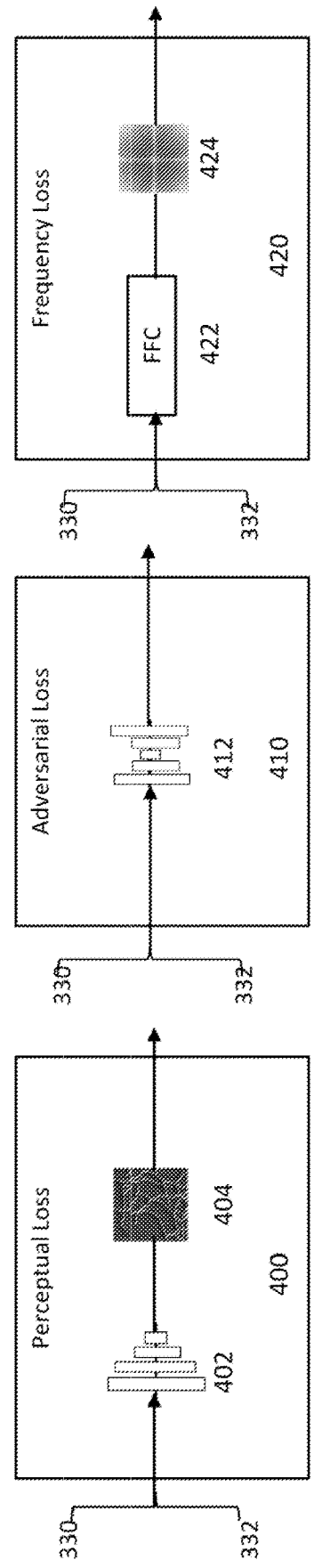

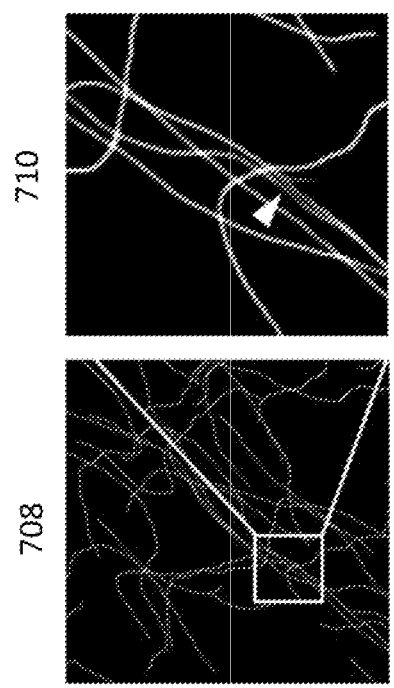
Figure 7A
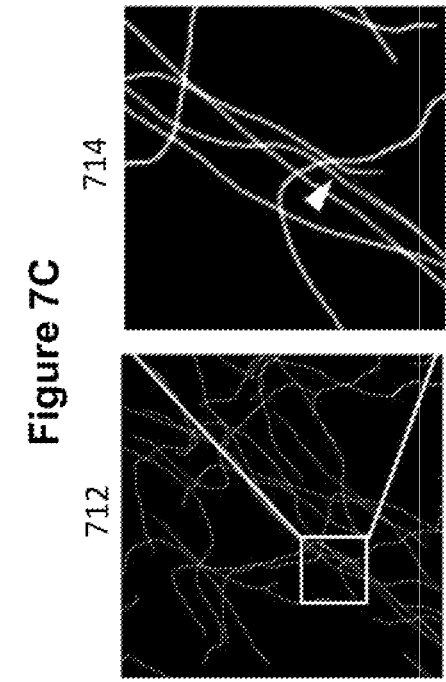
Figure 7C
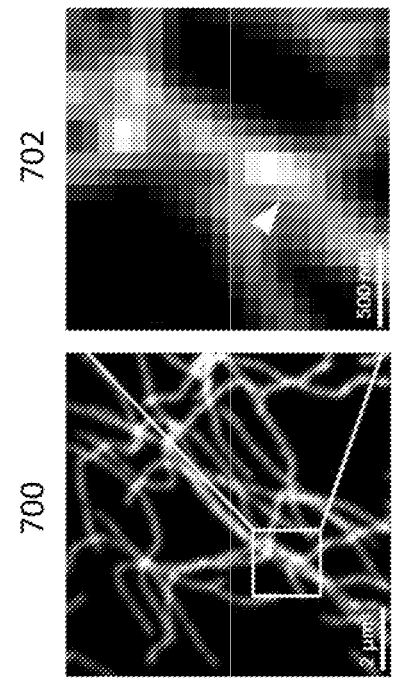
Figure 7B
Figure 7D

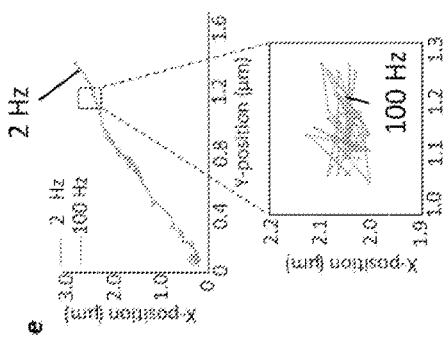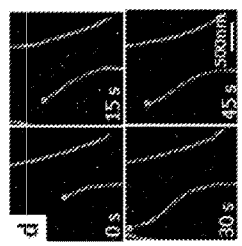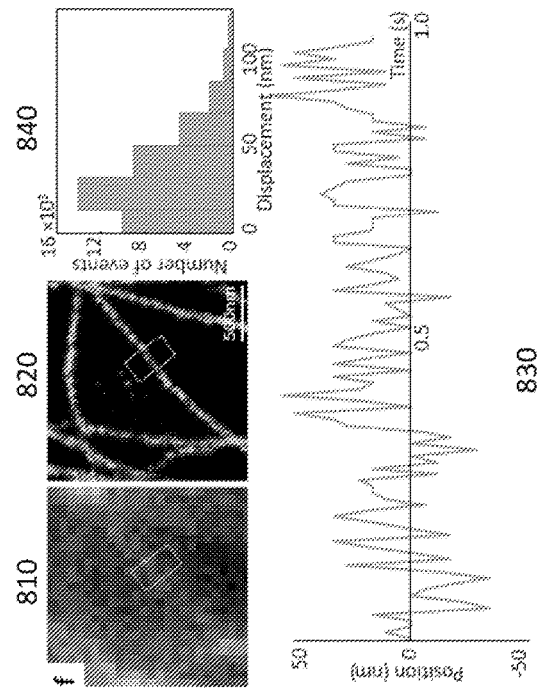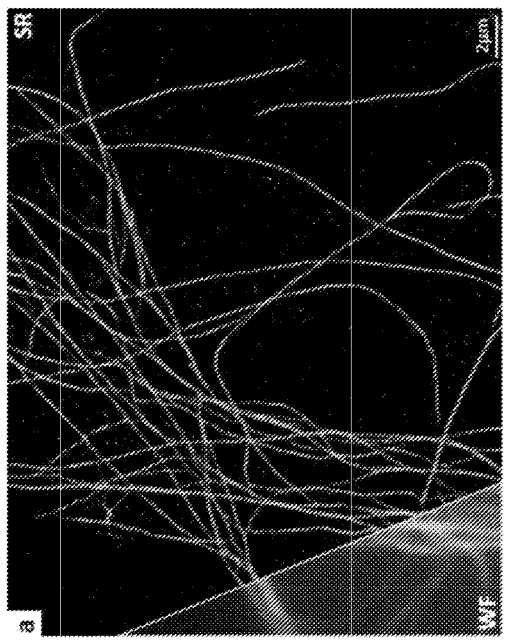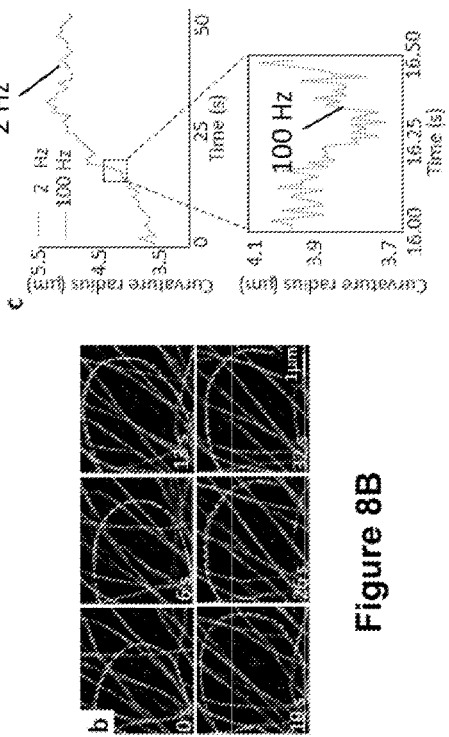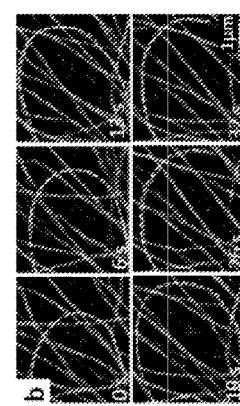
Figure 8A
Figure 8B
Figure 8C
Figure 8D
Figure 8E
Figure 8F

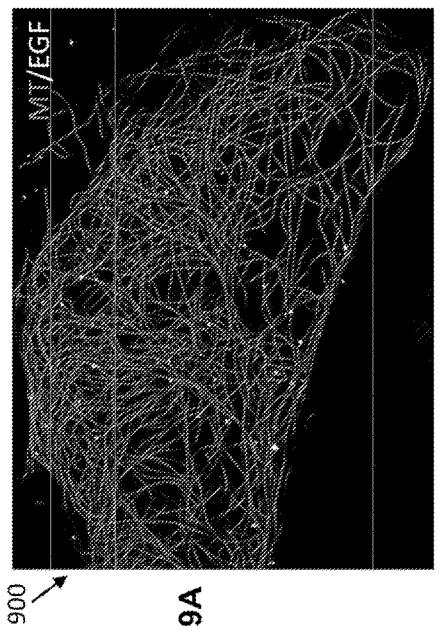
Figure 9A
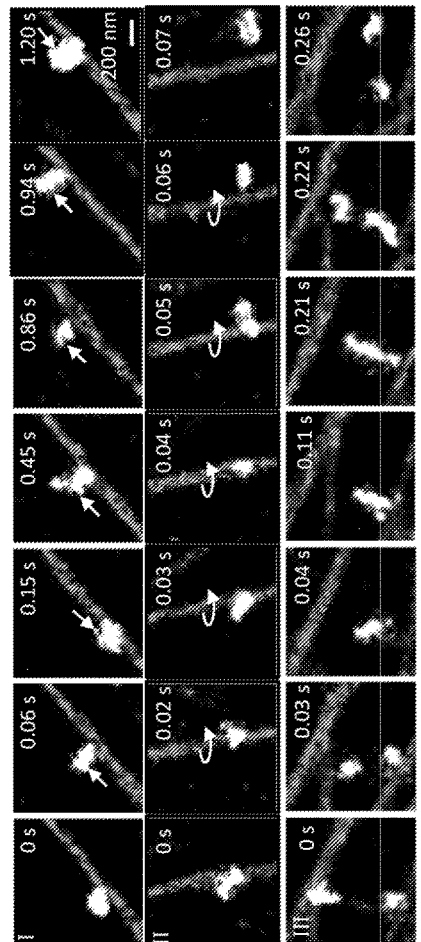
Figure 9B(I)
Figure 9B(II)
Figure 9B(III)
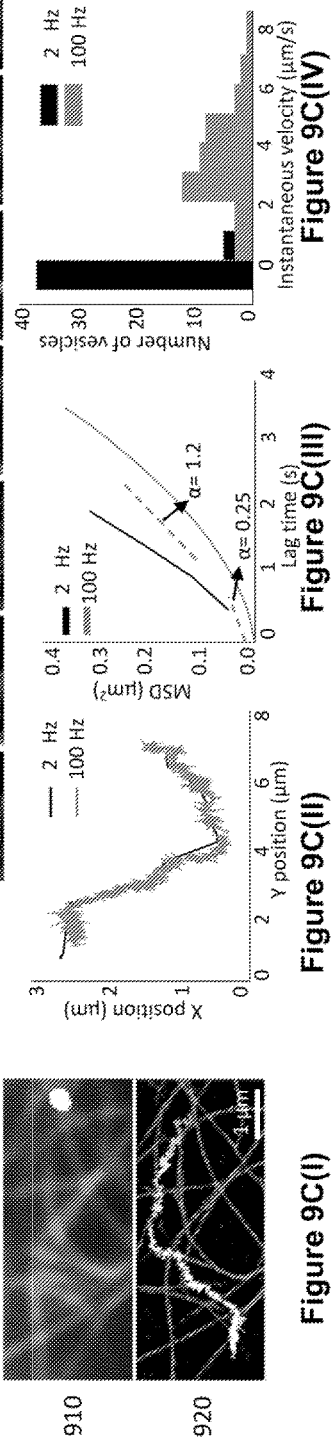
Figure 9C(II)
Figure 9C(III)
Figure 9C(IV)
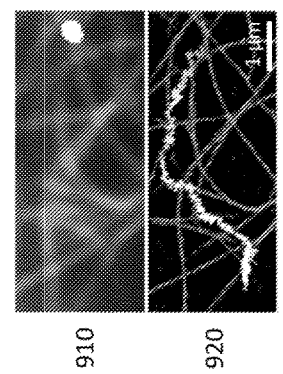
Figure 9C(I)

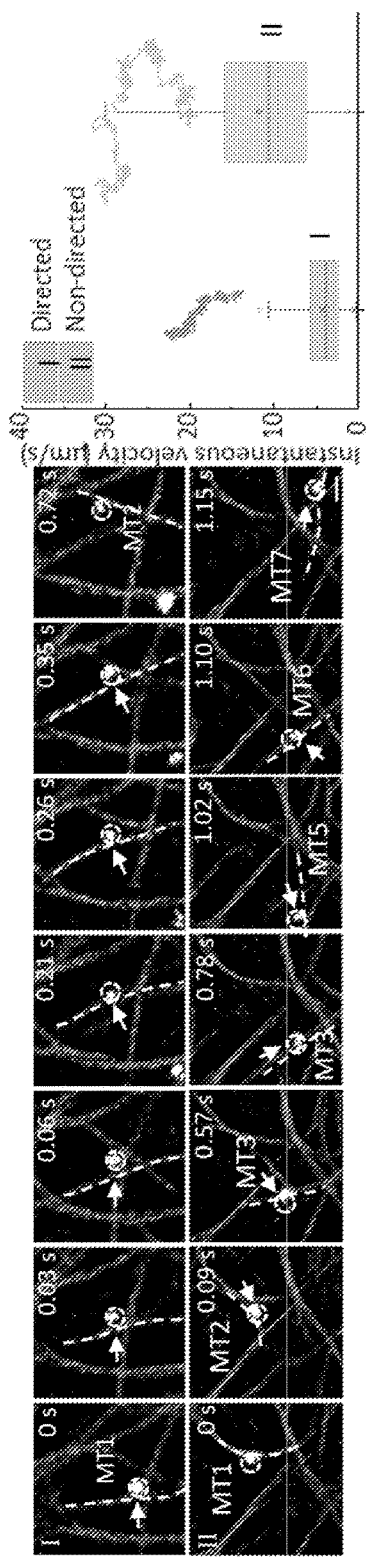
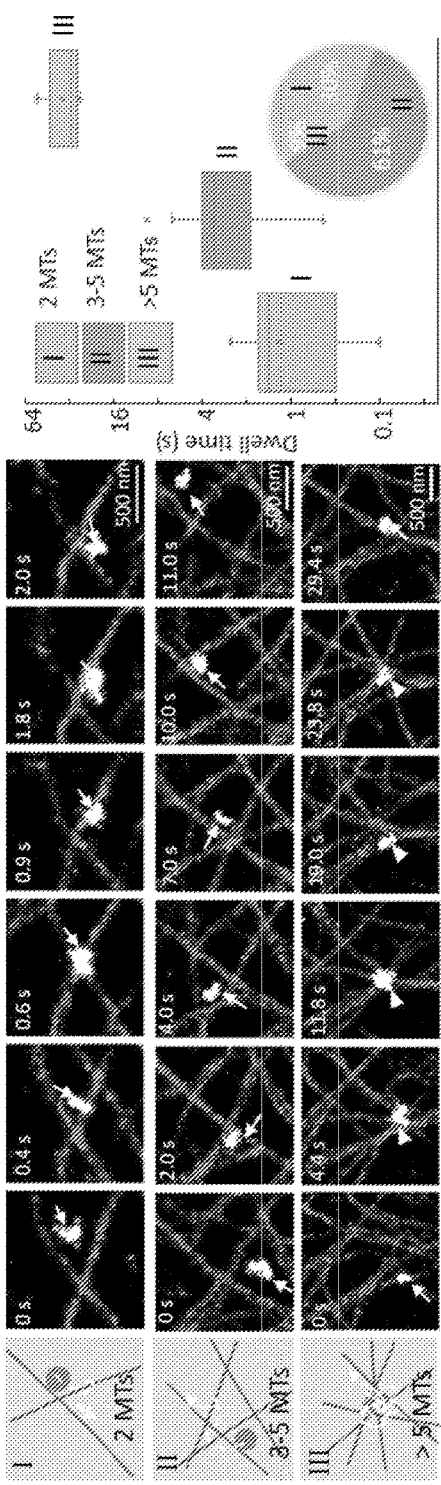
Figure 9D(I)
Figure 9D(II)
Figure 9E
Figure 9F(I)
Figure 9F(II)
Figure 9F(III)
Figure 9G

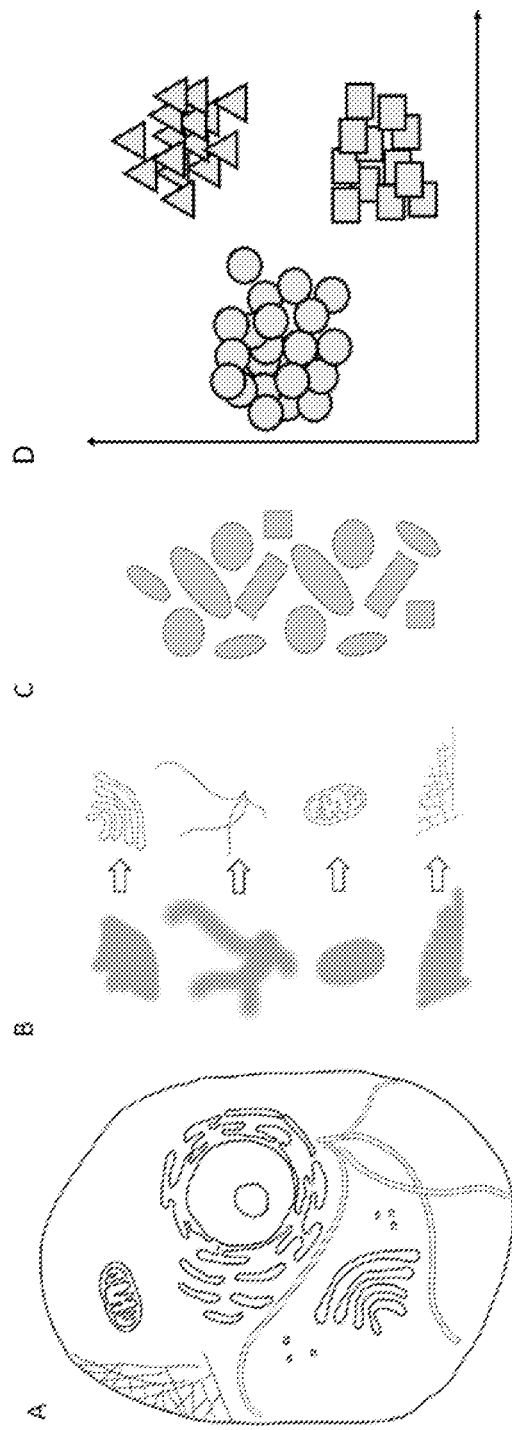

DEEP LEARNING BASED SINGLE FRAME SUPER RESOLUTION MICROSCOPY IMAGE PROCESSING

CROSS-REFERENCE TO RELATED APPLICATION

The present application claims priority to, and the benefit of, U.S. Provisional Application No. 63/252,181 filed on 5 Oct. 2021, the disclosure of which is incorporated by reference herein in its entirety.

TECHNICAL FIELD

The present specification relates broadly, but not exclusively, to methods, devices, systems and computer readable media for image processing, more particularly, for single frame super resolution microscopy image processing.

BACKGROUND

Fluorescence microscopy has been an indispensable tool for biological studies, but its spatial resolution is limited by the light wave diffraction effect. Thus, conventional fluorescence microscopy is unable to resolve subcellular structures smaller than 200 nm.

In the past two decades, numerous types of super resolution microscopy have emerged bypassing the light wave diffraction limit, e.g., structured illumination microscopy (SIM), stimulated emission depletion (STED) microscopy, and single-molecule localization microscopy (SMLM). These super resolution microscopies can push the achievable resolution of fluorescent microscope to 20 nm to 150 nm; however, at the cost of increased phototoxicity and decreased imaging speed, which pose challenges for live-cell applications that require both high spatial and temporal resolution at the same time. For example, SMLM can be used to resolve subcellular structures and achieve a tenfold improvement in spatial resolution compared to that obtained by conventional fluorescence microscopy. However, the separation of single-molecule fluorescence events in thousands of frames dramatically increases the image acquisition time and phototoxicity, impeding the observation of instantaneous intracellular dynamics. Therefore, although numerous advanced fluorescent probes, optical imaging systems, and image reconstruction algorithms have been proposed for time-resolved and noninvasive super resolution imaging, inherent trade-offs among spatial and temporal resolutions, the achievable signal intensity, and cytotoxicity must be made due to the physical boundaries of optical systems.

To address the above technical limits, deep learning networks have been combined with different super resolution microscopies to surpass the hardware limits of fluorescent microscopes. Nonetheless, limited resolution improvements have been achieved. For image resolution to reach single-molecule precision, multiple frames with single-molecule fluorescence events are still required for a single super resolution image reconstruction. Therefore, fundamental problems of multi-frame super resolution imaging, such as the long acquisition time and photobleaching-induced phototoxicity in localization microscopy, still hinder its application in microscopy imaging, e.g., the imaging of live-cell dynamics.

As such, an efficient and compatible image processing approach that addresses the above technical limits, especially a single frame super resolution microscopy image processing approach that reconstructs a super resolution image from a single frame, without requiring multiple frames with single-molecule fluorescence events, is desired.

SUMMARY

According to an aspect, there is provided a computer-implemented method of image processing, the method comprising: receiving a low resolution image of an object; generating an edge map of the low resolution image by an edge extractor; and inputting the edge map and the low resolution image to a neural network to reconstruct a super resolution image of the object, wherein the neural network is trained using a multicomponent loss function.

According to another aspect, there is provided a device for image processing, the device comprising: at least one processor; and a memory including computer program code for execution by the at least one processor, the computer program code instructing the at least one processor to: receive a low resolution image of an object; generate an edge map of the low resolution image by an edge extractor; and input the edge map and the low resolution image to a neural network to reconstruct a super resolution image of the object, wherein the neural network is trained using a multicomponent loss function.

According to another aspect, there is provided a microscopy Imaging system, comprising: a fluorescence microscope to produce a low resolution image of an object, and a device for microscopy image processing of the low resolution image as described herein, wherein the device is coupled to the fluorescence microscope.

According to yet another aspect, there is provided a non-transitory computer readable storage medium having instructions encoded thereon that, when executed by a processor, cause the processor to perform one or more steps in a method for image processing as described herein.

BRIEF DESCRIPTION OF THE DRAWINGS

Embodiments and implementations are provided by way of example only, and will be better understood and readily apparent to one of ordinary skill in the art from the following written description, read in conjunction with the drawings, in which:

FIG. 3 shows a schematic diagram of an embodiment 300 of the device 100 in which an embodiment of the method 200 is implemented.

FIG. 4A depicts an embodiment of a perceptual loss function 400.

FIG. 4B depicts an embodiment of an adversarial loss function 410.

FIG. 4C depicts an embodiment of a frequency loss function 420.

Figure 5:
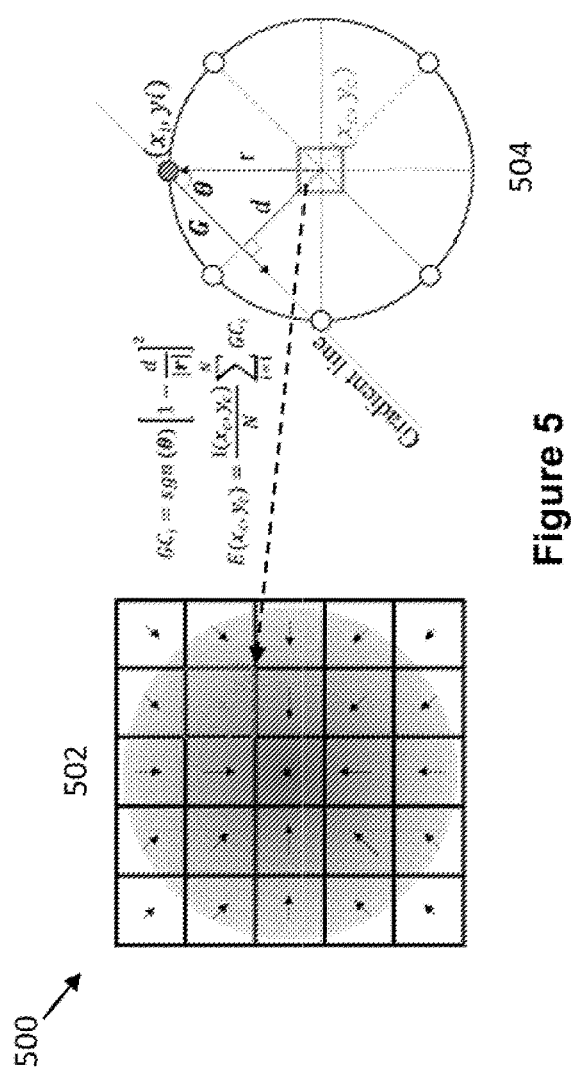
FIG. 5 shows a diagram depicting a method 500 for generating an edge map, according to an embodiment.

6C depicts an edge map 620 of the low resolution image 600 extracted by the method 500 of the present application as depicted in FIG. 5.

FIG. 7A shows a low resolution (LR) image 700 of an object and an enlarged image 702 of a region selected by a white square in the LR image 700.

FIG. 7B shows a ground truth (GT) image 704 of the object and an enlarged image 706 of a region selected by a white square in the GT image 704.

FIG. 7C shows a reconstructed image 708 of the object produced by a commonly used deep learning network trained by a conventional multi-scale similarity (MS-SSIM) loss function using a single input. FIG. 7C also shows an enlarged image 710 of a region selected by a white square in the reconstructed image 708.

FIG. 7D shows a reconstructed image 712 of the object produced by an embodiment of the method 200 for image processing of the present application. FIG. 7D also shows an enlarged image 714 of a region selected by a white square in the reconstructed image 712.

FIGS. 8A to 8H depict embodiments where SR images reconstructed based on the SFSRM image processing approach of the present application are utilised to investigate intracellular dynamics.

FIG. 8A shows a microscopy image 800 of an object. In this embodiment, the object comprises microtubules from cells expressing mEmerald-ensconsin.

FIG. 8B shows a plurality of SR images of microtubules reconstructed based on the SFSRM image processing approach as described in the present application.

FIG. 8C depicts curvature radius of the microtubule bending dynamics as shown in FIG. 8B at frequencies of 2 Hz and 100 Hz, respectively.

FIG. 8D shows a plurality of SR images of microtubules reconstructed based on the SFSRM image processing approach as described in the present application.

FIG. 8E depicts tip displacement of the microtubule tip growth and shrink dynamics as shown in FIG. 8D at frequencies of 2 Hz and 100 Hz, respectively.

FIG. 8F shows a LR image 810 of microtubules in a live-cell, a SR image 820 of the microtubules reconstructed based on the SFSRM image processing approach as described in the present application, a diagram 830 of microtubule fluctuation over time recorded at a frequency of 100 Hz, and a histogram 840 of microtubule transverse displacement at a 10 ms interval.

Figure 8G:
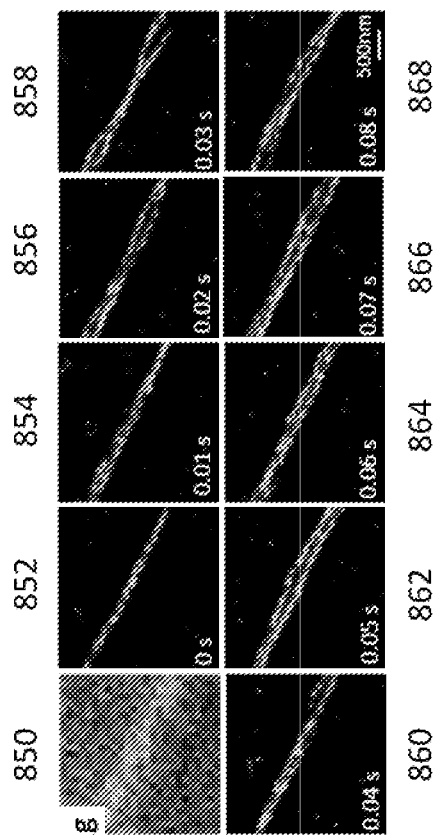

FIG. 8G shows a LR image 850 of microtubules in a live-cell and a plurality of SR images 852, 854, 856, 858, 860, 862, 864, 866, 868 of the microtubules reconstructed based on the SFSRM image processing approach as described in the present application.

Figure 8H:
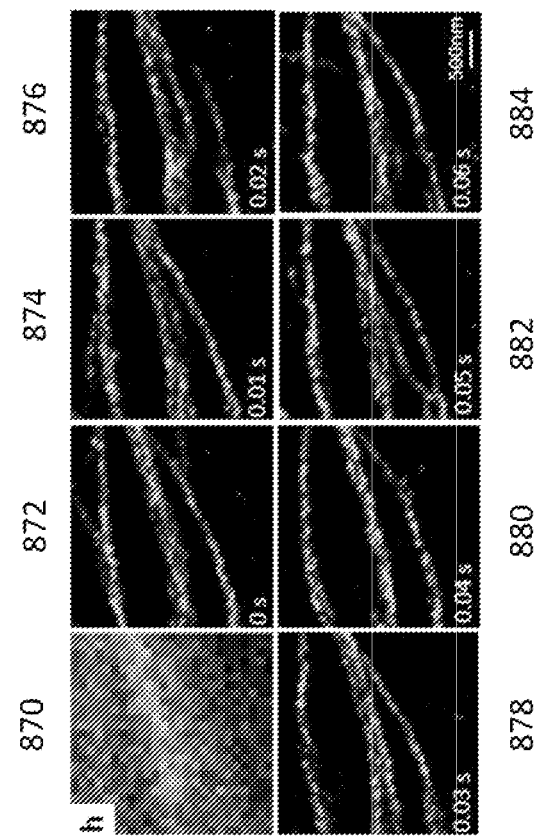

FIG. 8H shows a LR image 870 of microtubules in a live-cell and a plurality of SR images 872, 874, 876, 878, 880, 882, 884 of the microtubules reconstructed based on the SFSRM image processing approach as described in the present application.

FIGS. 9A to 9G depict embodiments where SR images reconstructed based on the SFSRM image processing approach of the present application are utilised to investigate organelle interactions.

FIG. 9A depicts a dual-channel SR image 900 of microtubules and vesicles from cells expressing m Emerald-ensconsin and endocytosed QDots655-streptavidin labeled Epidermal Growth Factor (EGF) protein, reconstructed based on the SFSRM image processing approach of the present application.

FIG. 9B(I) depicts a plurality of SR images of microtubules and vesicles reconstructed based on the SFSRM image processing approach as described in the present application.

FIG. 9B(II) depicts a plurality of SR images of microtubules and vesicles reconstructed based on the SFSRM image processing approach as described in the present application.

FIG. 9B(III) depicts a plurality of SR images of microtubules and vesicles reconstructed based on the SFSRM image processing approach as described in the present application.

FIG. 9C(I) shows a LR image 910 of microtubules and vesicles and a SR image 920 of the microtubules and vesicles reconstructed based on the SFSRM image processing approach as described in the present application.

FIG. 9C(II) shows a diagram of trajectories of vesicles from a LR image sequence (not shown) recorded at a frequency of 2 Hz and a SR image sequence (not shown) recorded at a frequency of 100 Hz. The trajectories show diffusive motions of vesicles along microtubules at a millisecond scale.]

FIG. 9C(III) shows a diagram of mean squared displacement (MSD) analysis of the trajectories in FIG. 9C(II).

FIG. 9C(IV) shows a histogram showing a statistical comparison of vesicle instantaneous velocities recorded at 2 Hz and 100 Hz, respectively.

FIGS. 9D(I) and 9D(II) depict embodiments where SR images reconstructed based on the SFSRM image processing approach of the present application are utilised to investigate microtubule dynamics resulting in non-directed transport of vesicles.

FIG. 9E depicts a box-and-whisker plot showing a statistical comparison of instantaneous velocities of directed and non-directed vesicle transports and their representative trajectories.

FIGS. 9F(I), 9F(II) and 9F(III) depict embodiments where SR images reconstructed based on the SFSRM image processing approach of the present application are utilised to investigate vesicle transport dynamics at different types of microtubule intersections in a cell.

FIG. 9G depicts a plot showing a statistical comparison of dwell time of the vesicles at the three categories of microtubule intersections and percentages of the vesicles in the cell via a pie chart.

FIGS. 10A to 10D depict embodiments where SR images reconstructed based on the SFSRM image processing approach of the present application are utilised for in situ genome sequencing in an interphase human fibroblast nucleus.

FIGS. 11A to 11D depict embodiments where SR images reconstructed based on the SFSRM image processing approach of the present application are utilised for image-based phenotype profiling or drug screening.

Figure 12:
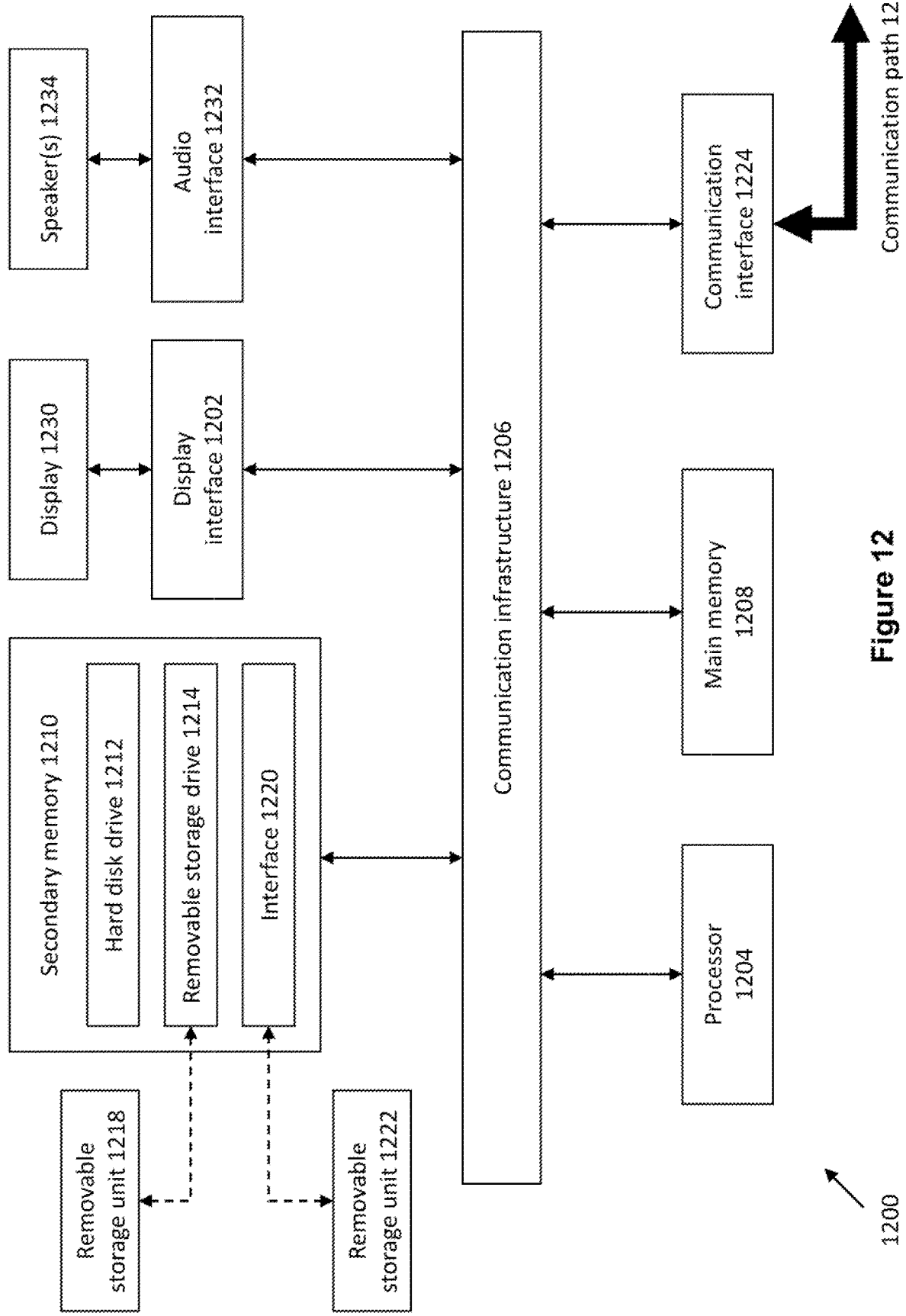

FIG. 12 shows a block diagram of a computer system 1200 suitable for use as a device for image processing.

Figure 13:
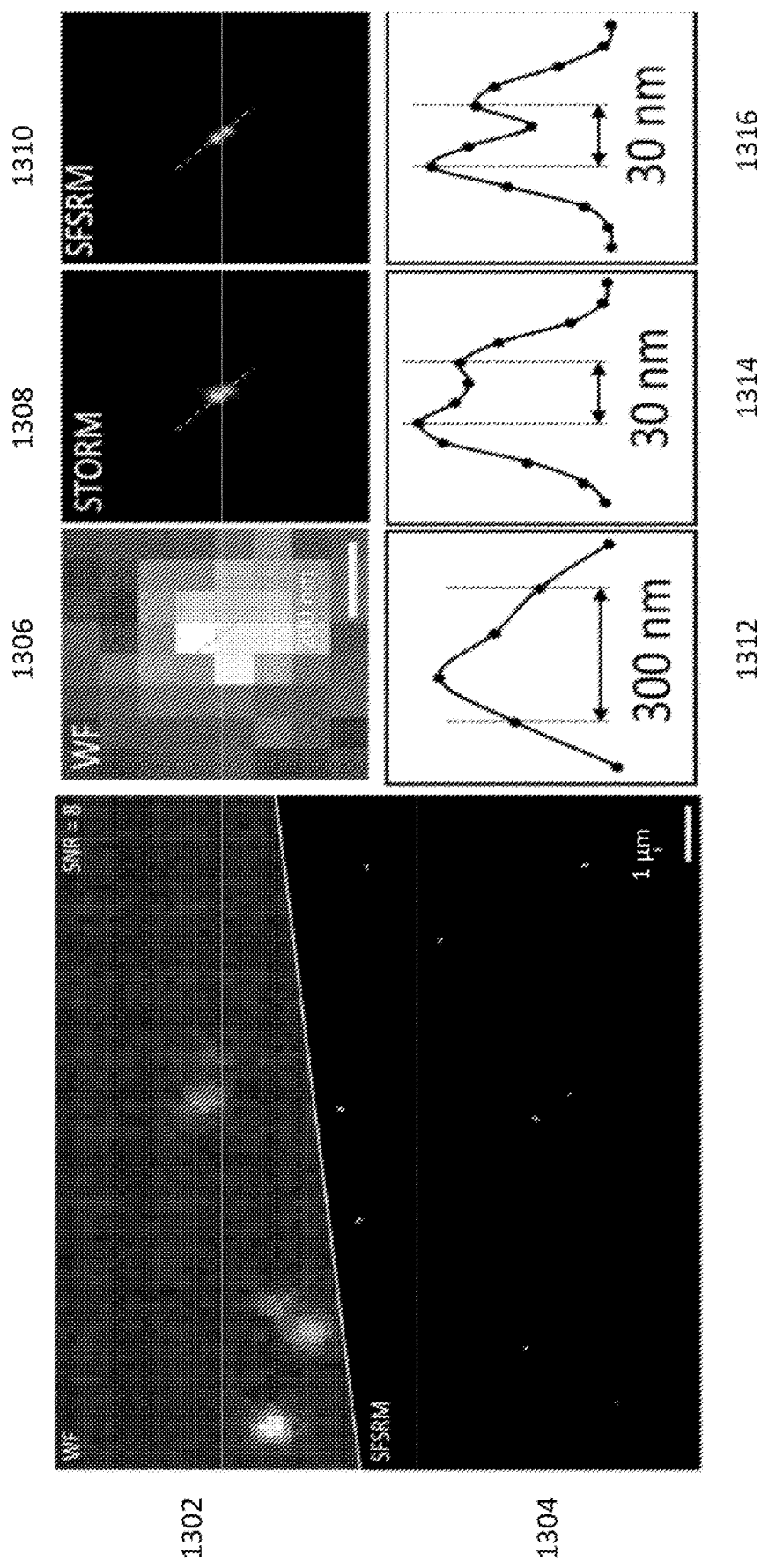

FIG. 13 shows an embodiment where the object comprises DNA nanorulers.

Figure 14:
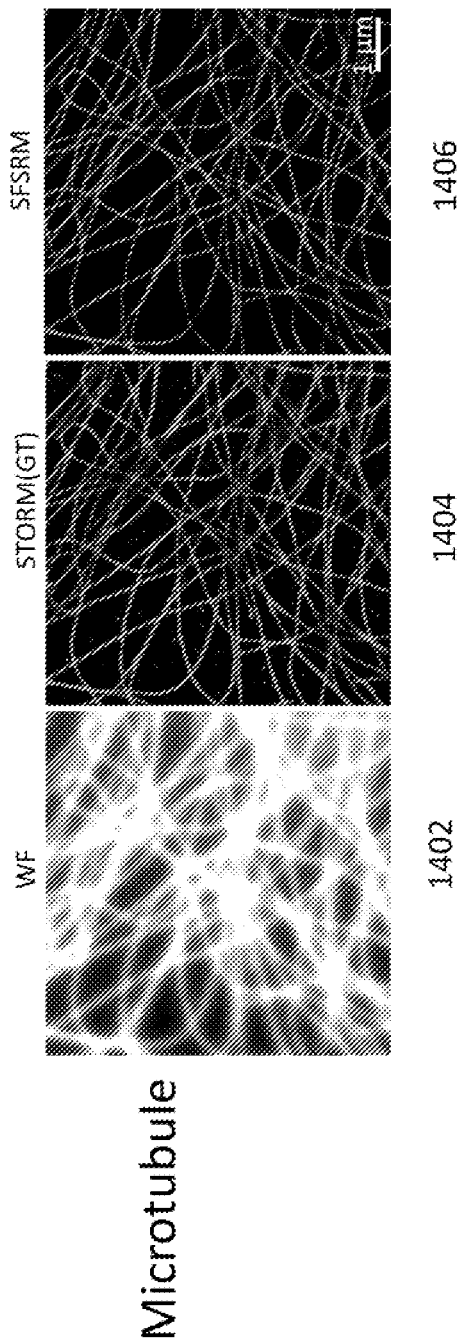

FIG. 14 shows a LR image 1402 of microtubules in a fixed cell, a ground truth (GT) image 1404 of the microtubules, and a SR image 1406 of the microtubules reconstructed from the LR image 1402 based on the SFSRM image processing approach of the present application.

Figure 15:
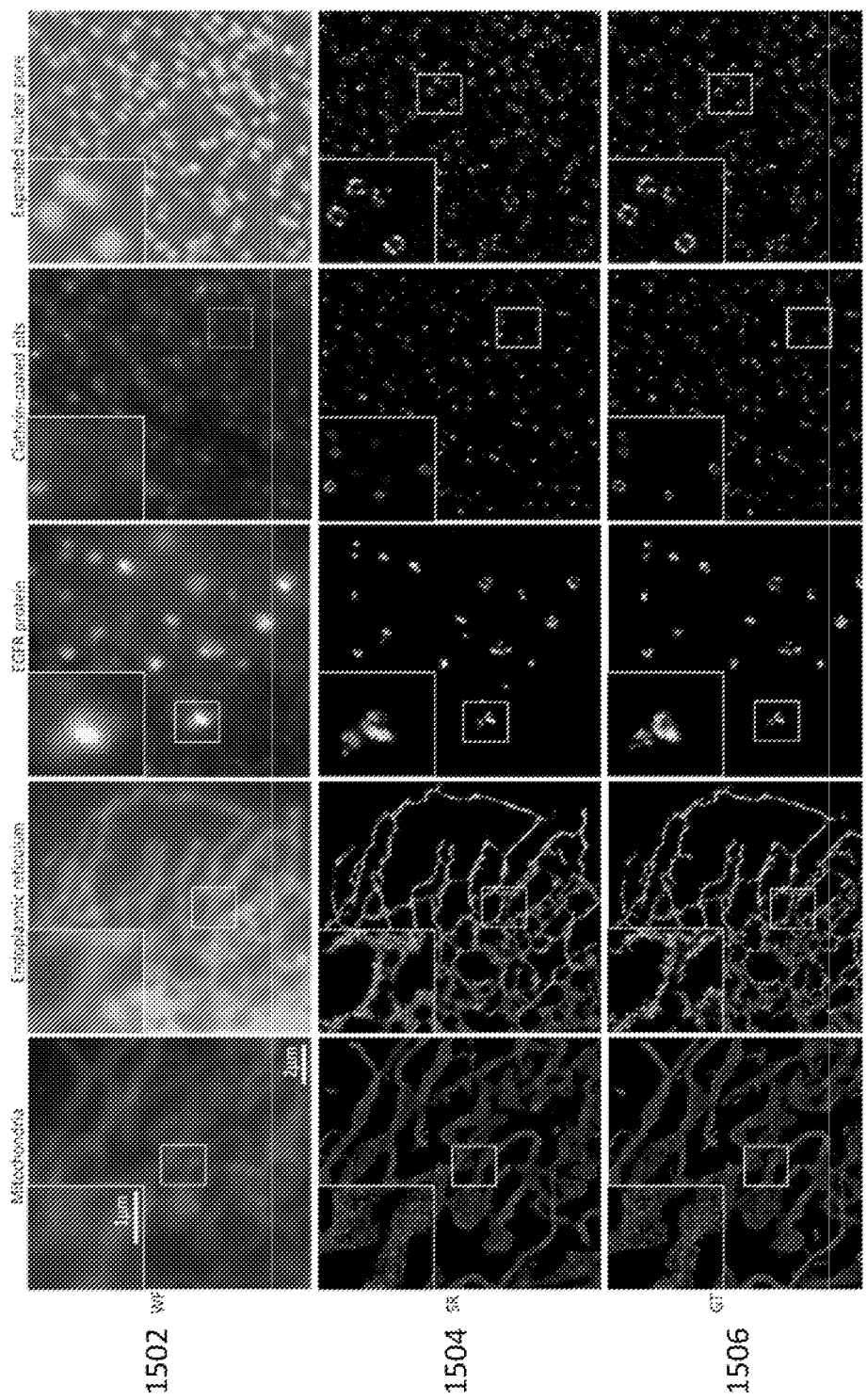

FIG. 15 shows an embodiment where the object comprises mitochondria labelled with mitochondrial membrane protein Tomm20, endoplasmic reticulum (ER) labelled with ER membrane protein Sec61β, EGFR protein after EGF endocytosis, clathrin-coated-pits after EGF endocytosis, and expanded nuclear pore complex protein Nup133.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "generating", "inputting", "reconstructing", "training", "extracting", "quantifying", "producing", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the present application provide image processing approaches that utilise a deep learning network optimized by a joint optimisation strategy to reconstruct a super resolution (SR) image based on a single low resolution image of an object. The joint optimisation strategy combines a prior information regulation and a multicomponent loss function to optimise the reconstruction, which enables a significant resolution improvement with a high detail accuracy in the reconstructed SR image.

When the low resolution image is a fluorescence microscopy image (e.g. a wide-field fluorescence microscopy image), the image processing approaches provide a single-frame super resolution microscopy (SFSRM) approach that reconstructs a SR image of single-molecule resolution from a single fluorescence microscopy image without requiring multiple frames with single molecule fluorescence events. In this manner, the present application advantageously improves the speed of super resolution microscope and avoids the phototoxicity induced by high illuminance that is required to generate single-molecule excitation, thus pushes the limit of fluorescent microscopy to unprecedented spatiotemporal resolutions with a limited photon budget and circumvents possible trade-offs among the spatial resolution, imaging speed, and light dose.

In addition to wide-field fluorescence microscopy imaging system, the well-trained deep learning network enables the image processing approaches (e.g. the SFSRM approach) to accommodate various microscopy imaging systems such as echo planar imaging (EPI), total internal reflection fluorescence (TIRF) microscopy imaging, confocal microscopy imaging, light sheet microscopy imaging, etc., which makes super resolution imaging possible for laboratories lacking advanced optical systems. The SFSRM approach has great potential in investigating subcellular processes that necessitate interpreting temporal dynamics in the context of ultrastructural information, which in turn advantageously open doors to new discoveries in live-cell imaging involving organelle dynamics and interaction, viral infection, cellular uptake and intracellular trafficking of nanoparticles, etc.

Moreover, the SFSRM approach can advantageously reconcile the conflict between high-resolution and high-throughput in any existing microscopy, making it suitable for large-scale, high-workload super resolution imaging such as whole-genome imaging, imaging-based assays of cell heterogeneity, phenotype profiling, and drug screening.

Figure 1:
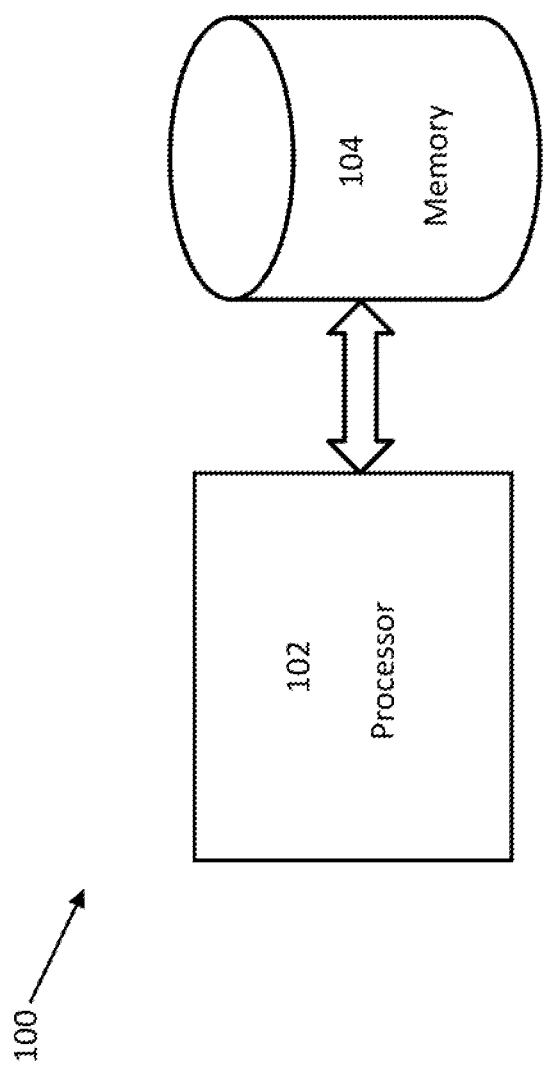
FIG. 1 is a schematic diagram of a device 100 for image processing according to an embodiment.
Figure 2:
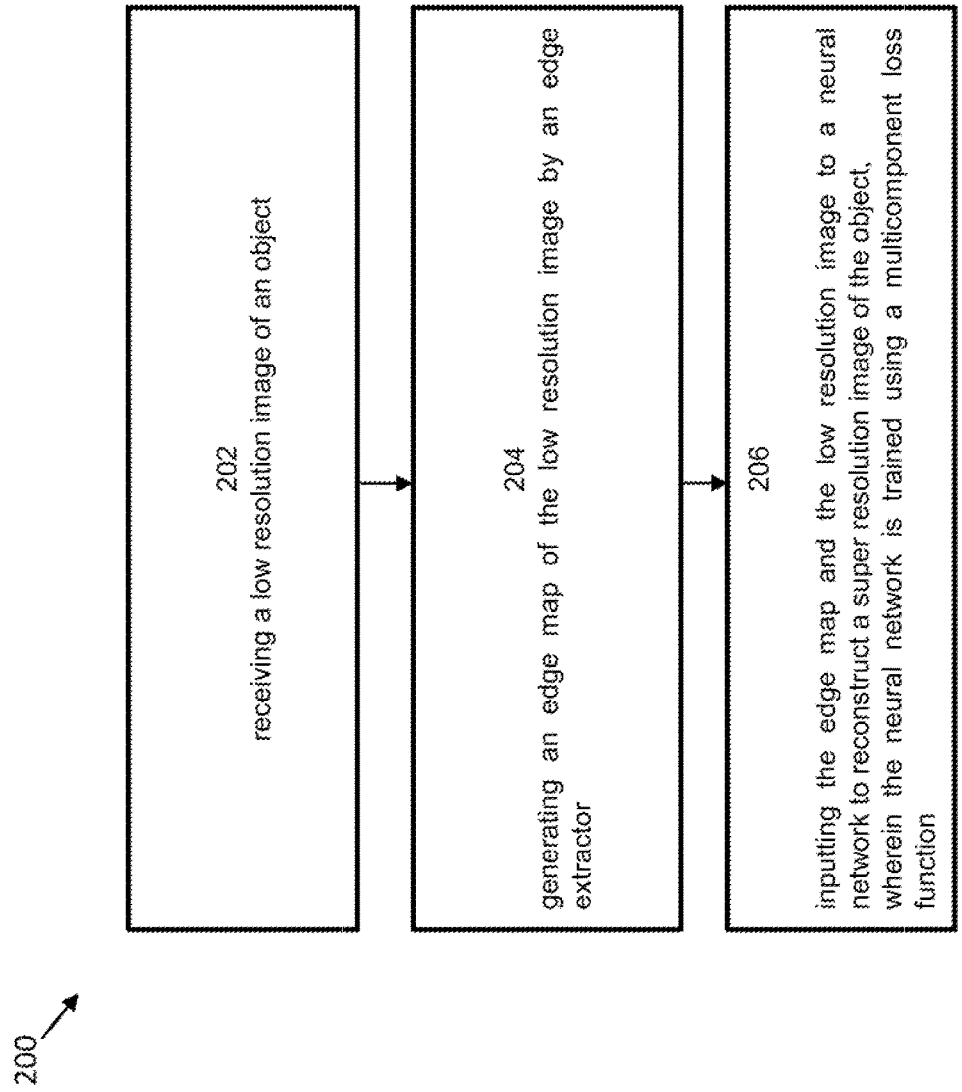
FIG. 2 is a flow chart illustrating a method 200 for image processing according to an embodiment.

FIG. 1 illustrates a schematic diagram of a device 100 for image processing. The device 100 at least includes one or more processor 102 and a memory 104. The at least one processor 102 and the memory 104 are interconnected. The memory 104 includes computer program code (not shown in FIG. 1) for execution by the at least one processor 102 to perform steps in accordance with a method of image processing, e.g., as exemplified in an embodiment 200 shown in FIG. 2 and described in the present application.

At step 202, the computer program code instructs the at least one processor 102 of the device 100 to receive a low resolution image of an object. In some embodiments, low resolution refers to a resolution ranging from 200 nm to 300 nm, whereas high resolution refers to a resolution ranging from 30 nm to 50 nm.

In some embodiments, the device 100 is a standalone device specially configured for image processing. In these embodiments, the at least one processor 102 of the device 100 can receive low resolution images from the memory 104 or storage units (not shown) in the device 100. These low resolution images can be previously taken by various imaging systems and transmitted to the device 100, or instantly taken by various imaging systems and transmitted to the device 100 for real time processing. In this manner, the device 100 is advantageously compatible to process various types of images taken by various microscopy imaging systems, e.g., wide-field fluorescence microscopy imaging system, echo planar imaging (EPI) system, total internal reflection fluorescence (TIRF) microscopy imaging system, confocal microscopy imaging system, light sheet microscopy imaging system, etc., to reconstruct super resolution images based on various low resolution images.

On the other hand, it is also understandable to those skilled in the art that the device 100 can be integrated into a microscopy imaging system and implemented as an integrated image processing component of the microscopy imaging system. Therefore, in some alternative embodiments, the device 100 can be coupled to a microscope component or a memory or storage component of the microscopy imaging system and receive a low resolution microscopy image therefrom. Based on the type of the microscopy imaging system, the device 100 is specified to reconstruct super resolution images based on a specific type of low resolution images.

In either of the above embodiments, the low resolution image is a fluorescence microscopy image of the object. Depending on the type of the microscopy imaging system the device 100 receives images from or the microscope component the device 100 is coupled to, the fluorescence microscopy image can be a wide-field fluorescence microscopy image, a confocal microscopy image, a total internal reflection fluorescence (TIRF) microscopy image, or a light sheet microscopy image.

The object comprises intracellular structures of one or more cells. The intracellular structures comprise one or more microtubules and/or organelles of the one or more cells. The organelles comprise one or more subcellular structures, e.g., nucleus, mitochondria, endoplasmic reticulum, Golgi apparatus, vesicles, vacuoles, etc. of the one or more cells.

In some embodiments, the subcellular structures comprise one or more DNA nanorulers, mitochondria labelled with mitochondrial membrane protein Tomm20, endoplasmic reticulum (ER) labelled with ER membrane protein Sec61β, EGFR protein after EGF endocytosis, clathrin-coated-pits after EGF endocytosis, and expanded nuclear pore complex protein Nup133. These embodiments are depicted in FIGS. 13 and 15 and described in the corresponding description.

In some embodiments, the one or more cells comprises a live cell. Embodiment of the one or more cells being a live cell is depicted in FIGS. 8F-8H and described in the corresponding description.

In some other embodiments, the one or more cells can be a fixed cell. An embodiment of the one or more cells being a fixed cell is depicted in FIG. 14 and described in the corresponding description.

In some embodiments, the one or more cells comprise a human fibroblast cell. The organelles comprise genomic regions of the nucleus of the human fibroblast cell.

Thereafter, at step 204, the computer program code instructs the at least one processor 102 of the device 100 to generate an edge map of the low resolution image by an edge extractor.

An embodiment method 500 of the step 204 of generating an edge map 502 is depicted in FIG. 5. With reference to FIG. 5, in step 204, the edge extractor (not shown) of the device 100 extracts the edge map 502 on a subpixel level based on a radial symmetry 504 of fluorophore in the fluorescence microscopy image, wherein an edge intensity at each subpixel ($x_c$, $y_c$) is defined by an extent θ to which surrounding intensity gradients converge to the subpixel, represented as $$GC_i = \text{sgn}(\theta)\left[1 - \frac{d}{|r|}\right]^2,$$

and wherein the edge intensity is weighted by a pixel intensity I of the subpixel ($x_c$, $y_c$). Therefore, the edge map 502 can be represented as $$E(x_c, y_c) = \frac{I(x_c, y_c)}{N}\sum_{i=1}^{N} GC_i.$$

By determining edges of intracellular structures in the fluorescence microscopy image, features of the intracellular structures are extracted in the edge map 502.

Thereafter, at step 206, the computer program code instructs the at least one processor 102 of the device 100 to input the edge map and the low resolution image to a neural network to reconstruct a super resolution image of the object, wherein the neural network is trained using a multicomponent loss function.

In an embodiment, the neural network is an enhanced super-resolution generative adversarial network (ESR-GAN). It is understandable to those skilled in the art that the neural network can be implemented by other deep learning neural networks.

In some embodiments, the multicomponent loss function comprises one or more of a pixel-oriented loss function, a perceptual loss function, an adversarial loss function, and/or a frequency loss function. In an embodiment, the pixel-oriented loss function comprises a multi-scale structure similarity (MS-SSIM) and L1-norm loss function, i.e. MS-SSIM-L1 loss function. In this regard, FIGS. 4A, 4B and 4C respectively illustrates embodiments of a perceptual loss function 400, an adversarial loss function 410 and a frequency loss function 420, the details of which are provided in the following paragraphs with respect to these figures.

Thereafter, the computer program code instructs the at least one processor 102 of the device 100 to input the reconstructed super resolution image of the object and a ground true image of the object to the multicomponent loss function to quantify differences between the reconstructed super resolution image and the ground true image. This step is depicted as step 330, 332 in FIG. 3, the details of which are provided in the following paragraphs with respect to FIG. 3.

Subsequently, the computer program code instructs the at least one processor 102 of the device 100 to input the quantified differences between the reconstructed super resolution image and the ground true image to the neural network for subsequent training to optimize the neural network. This step is depicted as step 334 in FIG. 3, the details of which are provided in the following paragraphs with respect to FIG. 3.

As described above, FIG. 3 illustrates an embodiment 300 of the device 100 in which an embodiment of the method 200 is implemented.

For the sake of implicitly, the embodiment 300 of the device 100 is depicted to comprise a neural network 306 and a multicomponent loss function component 312. It is understandable to those skilled in the art that the device 100 may include other components that are not shown in FIG. 3. In some embodiments, the neural network 306 and the multicomponent loss function component 312 can be implemented as separate components in the device 100. Alternatively, the neural network 306 and the multicomponent loss function component 312 can be integrated into one deep network training component in the device 100 based on the practical needs and requirements.

As shown in FIG. 3, a low resolution image 302 of an object is received by the device 100 according to step 202 of the method 200. As described above, the low resolution image 302 can either be received from a memory or storage unit of the device 100 or from a microscope component or a memory or storage component of a microscopy imaging system.

Figures 6A, 6B, 6C, 6D:
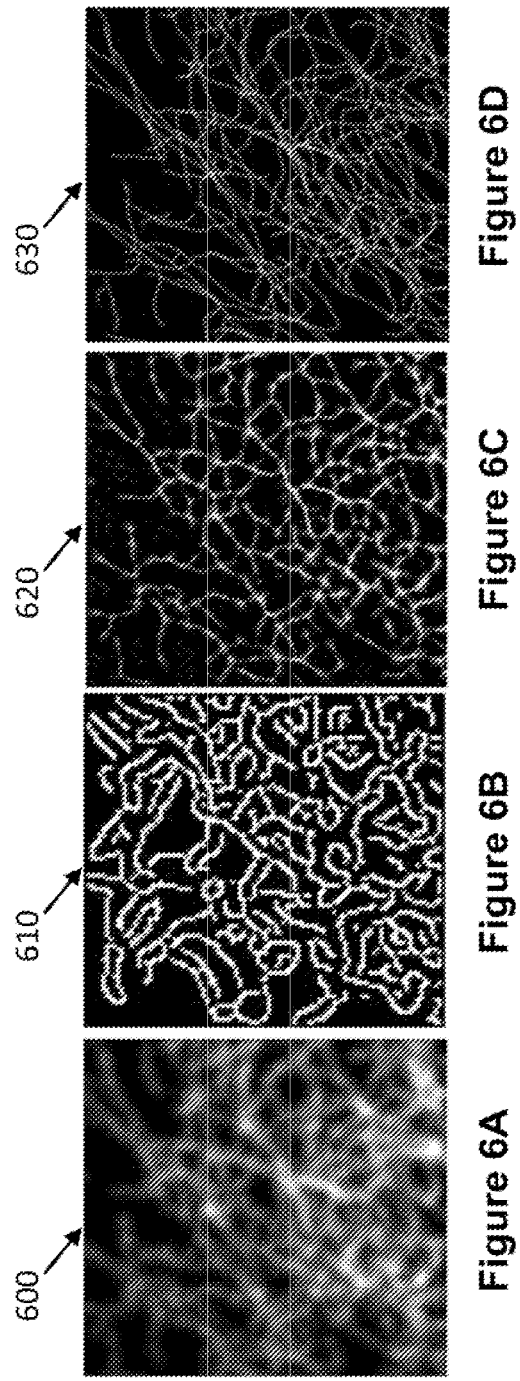
FIG. 6A depicts an embodiment of a low resolution (LR) image 600 of an object.
FIG. 6D depicts a ground truth image 630 of the object. In this embodiment, the object comprises microtubules (MTs).
FIG. 6B depicts an edge map 610 of the low resolution image 600 extracted by Canny operator. In comparison, FIG.

An embodiment of the low resolution image 302 of the object is shown in a low resolution (LR) image 600 in FIG. 6A. FIG. 6D depicts a ground truth (GT) image 630 of the object. In this embodiment, the LR image is degraded from the ground truth image 630 by 200 nm point-spread-function blurring and then downsampling for 10 times. In this embodiment, the object comprises microtubules (MTs).

Another embodiment of the low resolution image 302 of the object is shown in a low resolution (LR) image 700 in FIG. 7A. FIG. 6B depicts a ground truth (GT) image 704 of the object. In this embodiment, the LR image is degraded from the ground truth image 704 by 200 nm point-spread-function blurring and then downsampling for 10 times. In this embodiment, the object comprises microtubules (MTs).

Thereafter, an edge map 304 of the low resolution image 302 is generated 322 by an edge extractor (not shown) according to step 204 of the method 200.

Unlike conventional edge extraction operators, such as Prewitt, Canny, Roberts, and Sobel operator, that define edges from the intensity gradient of images, the edge extractor (not shown) of the device 100 extracts the edge map 302 on a subpixel level based on a radial symmetry 504 of fluorophore in the fluorescence microscopy image as described above, which can advantageously generate a clearer edge map with a more accurate edge information of the intracellular structures, e.g. the microtubules.

A comparison of the edge extractions is shown in FIGS. 6B and 6C. FIG. 6B depicts an edge map 610 of the low resolution image 600 extracted by the conventional Canny operator. In comparison, FIG. 6C depicts an edge map 620 of the low resolution image 600 extracted by the method 500 of the present application as depicted in FIG. 5. FIG. 6C clearly shows that the edge map 620 generated by the present application provides a more accurate edge information of the microtubules compared to the edge map 610 generated by the conventional Canny operator.

As features of the intracellular structures can be extracted in the edge map 620 by determining edges of intracellular structures in the low resolution image 600, the edge map 620 generated by the present application with a more accurate edge information of the microtubules can advantageously and inherently result in a super resolution image reconstructed with a high detail accuracy.

Subsequently, the edge map 304 and the low resolution image 302 are inputted 324, 326 to the neural network 306 to reconstruct a super resolution image 308 of the object according to step 206 of the method 200, wherein the neural network is trained using the multicomponent loss function 312.

Thereafter, the reconstructed super resolution image 308 of the object and a ground true image 310 of the object are inputted to the multicomponent loss function 312 at step 330, 332 to quantify differences between the reconstructed super resolution image 308 and the ground true image 310.

As shown in FIG. 3, the multicomponent loss function 312 comprises a pixel-oriented loss function 314, a perceptual loss function 316, an adversarial loss function 318, and a frequency loss function 320. In this embodiment, the pixel-oriented loss function comprises a MS-SSIM-L1 loss function, which measures a pixel-wise difference between the super resolution image 308 and the ground truth image 310.

FIG. 4A depicts an embodiment 400 of the perceptual loss function. In this embodiment, the perceptual loss function 400 receives the reconstructed super resolution image 308 and the ground truth image 310 at steps 330, 332 and measures differences between features maps extracted from the reconstructed super resolution image 308 and the ground truth image 310 by a Visual Geometry Group (VGG) neural network 402. It is appreciable to those skilled in the art that other neural networks can also be used alternative or in addition to the VGG neural network 402.

FIG. 4B depicts an embodiment 410 of the adversarial loss function. In this embodiment, the adversarial loss function 410 receives the reconstructed super resolution image 308 and the ground truth image 310 at steps 330, 332 and distinguishes fuzziness of the ground truth image 310 from that of the reconstructed super resolution image 308 by a U-net neural network 412. It is appreciable to those skilled in the art that other neural networks can also be used alternative or in addition to the U-net neural network 402.

FIG. 4C depicts an embodiment 420 of a frequency loss function. In this embodiment, the frequency loss function 420 receives the reconstructed super resolution image 308 and the ground truth image 310 at steps 330, 332 and compares frequency spectrum differences 424 of the reconstructed super resolution image 308 and the ground truth image 310 in a specified frequency region through a fast Fourier transform function 422. In some embodiments, the specified region for frequency comparison comprises a whole spectrum for images without noise and 75% of the spectrum for images with noise.

Subsequently, the quantified differences between the reconstructed super resolution image 308 and the ground true image 310 are inputted at step 334 to the neural network 306 for subsequent training to optimize the neural network 306.

As shown in FIG. 3 and FIGS. 4A to 4C, the multicomponent loss function 312 combines pixel-oriented loss with perceptual loss to improve the fidelity/accuracy of details in the reconstructed super resolution image 308, and combines adversarial loss with frequency loss to penalize blur and suppress high-frequency artifacts in the reconstructed super resolution image 308. In this manner, the present application advantageously allows fine structure reconstruction from a 10 times degraded low resolution image, which produces a reconstructed super resolution image 308 that achieves a high detail accuracy at an MS-SSIM index of 0.96 with respect to the ground truth image 310, as shown in FIGS. 7A to 7D.

A comparison of detail accuracies among a low resolution (LR) image 700, a ground truth (GT) image 704, a reconstructed image 708 produced by a commonly used deep learning network trained by a conventional multi-scale similarity (MS-SSIM) loss function using a single input, and a reconstructed super resolution image 712 reconstructed by the method 200 for image processing of the present application is shown in FIGS. 7A to 7D.

FIG. 7A shows a low resolution (LR) image 700 of an object and an enlarged image 702 of a region selected by a white square in the LR image 700. As described above, the object comprises microtubules (MTs). The LR image 700 is degraded from the ground truth image 704 by 200 nm point-spread-function blurring and then downsampling for 10 times. Detailed structures in the selected region of the LR image 700 are indicated by a white arrow in the enlarged image 702. It can be seen that nearly no detail is recognisable in the enlarged image 702 of the LR image 700.

FIG. 7B shows a ground truth (GT) image 704 of the object and an enlarged image 706 of a region selected by a white square in the GT image 704. This selected region is the same as the selected region in the LR image 700. Detailed structures in the selected region of the GT image 704 are indicated by a white arrow in the enlarged image 706.

FIG. 7C shows a reconstructed image 708 of the object produced by a commonly used deep learning network trained by a conventional multi-scale similarity (MS-SSIM) loss function using a single input. FIG. 7C also shows an enlarged image 710 of a region selected by a white square in the reconstructed image 708. This selected region is the same as the selected region in the LR image 700. Detailed structures in the selected region of the reconstructed image 708 are indicated by a white arrow in the enlarged image 710. It can be seen that detailed structures are recognisable in the enlarged image 710. However, these recognisable detailed structures are deviated from the detailed structures in the enlarged image 706 of the GT image 704.

In comparison to FIG. 7C, FIG. 7D shows a reconstructed image 712 of the object reconstructed by the method 200 for image processing of the present application. FIG. 7D also shows an enlarged image 714 of a region selected by a white square in the reconstructed image 712. This selected region is the same as the selected region in the LR image 700. Detailed structures in the selected region of the reconstructed image 712 are indicated by a white arrow in the enlarged image 714. It can be seen that detailed structures are recognisable in the enlarged image 714. Advantageously, these recognisable detailed structures are very similar to the detailed structures in the enlarged image 706 of the GT image 704, which shows a satisfying image reconstruction with a high detail accuracy.

As shown in FIGS. 7A to 7D, the reconstructed image 712 produced by the method 200 for image processing of the present application correctly reconstructs fine structures of the selected region with high similarity to those shown in the GT image 704 and the enlarged image 706, while the reconstructed image 708 produced by the commonly used deep learning network trained by the MS-SSIM loss function using a single input fails to reconstruct the correct structure.

The above accurate high resolution image reconstruction achieved by the method 200 of image processing as depicted in FIGS. 2 to 5 is based on a single low resolution image, i.e., a single frame. It shows that the present application advantageously provides a single frame super resolution microscopy (SFSRM) image processing approach that reconstructs a super resolution image from a single frame with a high detail accuracy.

That is, the image processing approaches of the present application provide a single frame super resolution (SR) microscopy (SFSRM) approach that reconstructs a SR image of single molecule resolution from a single fluorescence microscopy image without requiring multiple frames with single molecule fluorescence events. In this manner, the present application advantageously improves the speed of super resolution microscope and avoids the phototoxicity induced by high illuminance that is required to generate single-molecule excitation, thus pushes the limit of fluorescent microscopy to unprecedented spatiotemporal resolutions with a limited photon budget and circumvents possible trade-offs among the spatial resolution, imaging speed, and light dose.

In addition, the well-trained deep learning network 306 enables the image processing approaches (e.g. the SFSRM approach) to accommodate various microscopy imaging systems such as wide-field fluorescence microscopy imaging, echo planar imaging (EPI), total internal reflection fluorescence (TIRF) microscopy imaging, confocal microscopy imaging, light sheet microscopy imaging, etc., which makes super resolution imaging possible for laboratories lacking advanced optical systems. The SFSRM approach has great potential in investigating subcellular processes that necessitate interpreting temporal dynamics in the context of ultrastructural information, which in turn advantageously open doors to new discoveries in live-cell imaging involving organelle dynamics and interaction, viral infection, cellular uptake and intracellular trafficking of nanoparticles, etc.

Moreover, the SFSRM approach can advantageously reconcile the conflict between high-resolution and high-throughput in any existing microscopy, making it suitable for large-scale, high-workload super resolution imaging such as whole-genome imaging, imaging-based assays of cell heterogeneity, phenotype profiling, and drug screening.

SFSRM Image Processing Approach Utilised in Investigating Intracellular Dynamics at Ultrahigh Spatiotemporal Resolution FIGS. 8A to 8H depict embodiments where SR images reconstructed based on the SFSRM image processing approach of the present application are utilised to investigate intracellular dynamics. Details are as follows.

Microtubules (MTs) are regarded as highway transport systems in cells. MT dynamics is involved in multiple cellular functions, such as organising and maintaining cell shape, promoting cilia movement, and mediating cargo transport. Due to the resolution limit of traditional fluorescent microscope, in vivo MT fluctuation in conventional technology is only inferred from the motion of bound motor proteins. In FIGS. 8A to 8H, the SR images reconstructed based on the SFSRM image processing approach of the present application successfully visualise dynamics of MT that were unexplored in the known art.

FIG. 8A shows a microscopy image 800 of an object. In this embodiment, the object comprises microtubules from cells expressing mEmerald-ensconsin. The microscopy image 800 includes a fraction of a low resolution (LR) image of microtubules on the bottom left of the image 800. In an embodiment, the LR image is a wide field (WF) fluorescence microscopy image. The microscopy image 800 also includes a super resolution (SR) image of the microtubules reconstructed based on the SFSRM image processing approach as described in the present application on the remaining part of the image 800. With the unprecedented resolution improvement provided by the SFSRM image processing approach, the tangled MT network is clearly resolved, and MTs with various morphologies, such as bending, crossing and bundles can be observed in the SR image in FIG. 8A.

FIG. 8B shows a plurality of SR images of microtubules reconstructed based on the SFSRM image processing approach as described in the present application. The reconstructed SR images correspond to LR images of the microtubules taken at $0^{th}$ second, $6^{th}$ second, $13^{th}$ second, $19^{th}$ second, $26^{th}$ second, and $32^{nd}$ second, respectively. In FIG. 8B, the plurality of the SR images are indicative of microtubule bending dynamics of the microtubules.

In FIGS. 8B to 8H and the following figures in FIGS. 9A to 9G of the present application depicting a plurality of SR images of microtubules or other intracellular structures reconstructed based on the SFSRM image processing approach, it is understandable to those skilled in the art that various numbers of LR images can be taken at various intervals (i.e., various imaging speeds) based on the practical needs and the corresponding SR images can be reconstructed accordingly.

FIG. 8C depicts curvature radius of the microtubule bending dynamics as shown in FIG. 8B at frequencies of 2 Hz and 100 Hz, respectively. It is shown in FIG. 8C that the motion details of the microtubules are clearly captured by the SR images reconstructed based on the SFSRM image processing approach of the present application, even at an imaging speed of 100 Hz.

FIG. 8D shows a plurality of SR images of microtubules reconstructed based on the SFSRM image processing approach as described in the present application. The reconstructed SR images correspond to LR images of the microtubules taken at $0^{th}$ second, $15^{th}$ second, $30^{th}$ second, and $45^{th}$ second, respectively. In FIG. 8D, the plurality of the SR images are indicative of microtubule tip growth and shrink dynamics of the microtubules.

FIG. 8E depicts tip displacement of the microtubule tip growth and shrink dynamics as shown in FIG. 8D at frequencies of 2 Hz and 100 Hz, respectively. It is shown in FIG. 8E that the tip displacement details of the microtubules are clearly captured by the SR images reconstructed based on the SFSRM image processing approach of the present application, even at an imaging speed of 100 Hz.

FIG. 8F shows a LR image 810 of microtubules in a live-cell, a SR image 820 of the microtubules reconstructed based on the SFSRM image processing approach as described in the present application, a diagram 830 of microtubule fluctuation over time recorded at a frequency of 100 Hz, and a histogram 840 of microtubule transverse displacement at a 10 ms interval.

FIG. 8G shows a LR image 850 of microtubules in a live-cell and a plurality of SR images 852, 854, 856, 858, 860, 862, 864, 866, 868 of the microtubules reconstructed based on the SFSRM image processing approach as described in the present application. Since it is shown in the above FIGS. 8E to 8F that structure details of the microtubules can be clearly captured by the SR images reconstructed based on the SFSRM image processing approach of the present application even at an imaging speed of 100 Hz, the reconstructed SR images in FIG. 8G correspond to LR images of the microtubules taken at an imaging speed of 100 Hz (i.e., having a time interval of 0.01 second). In FIG. 8G, the plurality of the SR images are indicative of microtubule bundle instability caused by inconsonant vibration of the microtubules.

FIG. 8H shows a LR image 870 of microtubules in a live-cell and a plurality of SR images 872, 874, 876, 878, 880, 882, 884 of the microtubules reconstructed based on the SFSRM image processing approach as described in the present application. Similar to FIG. 8G, the reconstructed SR images in FIG. 8H correspond to LR images of the microtubules taken at an imaging speed of 100 Hz (i.e., having a time interval of 0.01 second). In FIG. 8H, the plurality of the SR images are indicative of local microtubule topology changes in a short time.

FIGS. 8B to 8E illustrate that MT deformation dynamics, such as MT bending (see FIG. 8B), are recorded at an ultrafast imaging speed, which allows high frequency fluctuations including the time-varying MT bending radius to be captured in FIG. 8C (100 Hz) and the random-walk MT growth trajectory to be captured in FIG. 8e (100 Hz). These results indicate that the intracellular dynamics at the millisecond scale observed by the traditional fluorescent microscopes may be greatly underestimated at a low sampling frequency (see FIGS. 8C and 8E; 2 Hz) due to the hardware limits of the traditional fluorescent microscopes. This technical limit is addressed by the SR images reconstructed based on the SFSRM image processing approach of the present application.

Moreover, FIGS. 8F to 8H reveal for the first time the intracellular MT transverse vibration at a high frequency in the approximately 100 nm range (see FIG. 8F) which is undetectable in the low resolution wide-field (WF) microscopy image. The statistical analysis of the transverse MT displacement in 10 ms intervals (see the histogram 840 in FIG. 8F) shows that the typical displacement is approximately 30 nm, which is far larger than the system drift (less than 10 nm in 50 seconds), thus confirming the observation regarding true MT vibration in the present application. From FIGS. 8G and 8H, it can be seen that the inconsistent vibration of MTs in a bundle could cause bundle instability (see FIG. 8G), and the local MT network morphology can rapidly reform due to the random vibration of MTs (see FIG. 8H). The direct visualization of MT vibration investigated in FIGS. 8F to 8H can advantageously promote the comprehension of intracellular force fluctuations and provide evidence for different models of microtubule vibration.

SFSRM Image Processing Approach Utilised in Investigating Organelle Interactions at Ultrahigh Spatiotemporal Resolution FIGS. 9A to 9G depict embodiments where SR images reconstructed based on the SFSRM image processing approach of the present application are utilised to investigate organelle interactions. Details are as follows.

Intracellular environment is very clouded and dynamic. In the intracellular environment, organelles cooperating with each other to perform cellular functions. For example, cargo proteins endocytosed by the cell are carried in the vesicles and travel along the MT to nucleus. Studying the cargo transport process provides guidance for drug delivery or virus infection processes, hence is of high research interest. Due to the small size of vesicle (50 nm to 200 nm) and the dense microtubule, super resolution microscopies are needed to clearly reveal their spatial relationships. Unfortunately, super resolution microscopes cannot provide a high temporal resolution which is also needed to capture a dynamics interaction process.

The above technical limit is address by the SR images reconstructed based on the SFSRM image processing approach of the present application. FIGS. 9A to 9G clearly reveals vesicle transport details at up to 20 nm spatial resolution and 100 Hz temporal resolution.

FIG. 9A depicts a dual-channel SR image 900 of microtubules and vesicles from cells expressing mEmerald-ensconsin and endocytosed QDots655-streptavidin labeled Epidermal Growth Factor (EGF) protein, reconstructed based on the SFSRM image processing approach of the present application. By virtue of the high detail accuracy achieved by the present application, both microtubules and vesicles are recognisable from the reconstructed SR image 900.

Due to non-colour requirements in patent drawings, the vesicles are depicted in a highlighted tone while the microtubules are depicted relatively darker in FIG. 9A. In some embodiments, the dual-channel SR image 900 is a colour-merged image of a reconstructed SR image of microtubules and a reconstructed SR image of vesicles obtained using SR reconstruction depicted in FIG. 3.

The two reconstructed SR images of microtubules and vesicles can be based on two LR images of microtubules and vesicles captured by either single-channel microscopy or multichannel microscopy.

FIG. 9B(I) depicts a plurality of SR images of microtubules and vesicles reconstructed based on the SFSRM image processing approach as described in the present application. The reconstructed SR images correspond to LR images of the microtubules and vesicles taken at $0^{th}$ second, $0.06^{th}$ second, $0.15^{th}$ second, $0.45^{th}$ second, $0.86^{th}$ second, $0.94^{th}$ second and $1.20^{th}$ second, respectively. In FIG. 9B(I), the plurality of the SR images are indicative of vesicle transport dynamics when a vesicle moves back and forth along a microtubule.

FIG. 9B(II) depicts a plurality of SR images of microtubules and vesicles reconstructed based on the SFSRM image processing approach as described in the present application. The reconstructed SR images correspond to LR images of the microtubules and vesicles taken at $0^{th}$ second, $0.02^{nd}$ second, $0.03^{rd}$ second, $0.04^{th}$ second, $0.05^{th}$ second, $0.06^{th}$ second and $0.07^{th}$ second, respectively. In FIG. 9B(II), the plurality of the SR images are indicative of vesicle transport dynamics when a vesicle rotates around a microtubule.

FIG. 9B(III) depicts a plurality of SR images of microtubules and vesicles reconstructed based on the SFSRM image processing approach as described in the present application. The reconstructed SR images correspond to LR images of the microtubules and vesicles taken at $0^{th}$ second, $0.03^{rd}$ second, $0.04^{th}$ second, $0.11^{th}$ second, $0.21^{st}$ second, $0.22^{nd}$ second and $0.26^{th}$ second, respectively. In FIG. 9B(III), the plurality of the SR images are indicative of vesicle transport dynamics when a vesicle collides with another vesicle.

FIG. 9C(I) shows a LR image 910 of microtubules and vesicles and a SR image 920 of the microtubules and vesicles reconstructed based on the SFSRM image processing approach as described in the present application.

FIG. 9C(III) shows a diagram of trajectories of vesicles from a LR image sequence (not shown) recorded at a frequency of 2 Hz and a SR image sequence (not shown) recorded at a frequency of 100 Hz. The trajectories show diffusive motions of vesicles along microtubules at a millisecond scale.

FIG. 9C(III) shows a diagram of mean squared displacement (MSD) analysis of the trajectories in FIG. 9C(II). MSD reflects the mean-squared-distance $<\Delta r2\ (\tau)>$ of the vesicle traveled in a certain lag time r, which typically follows the power-law trend $<\Delta r2\ (\tau)>\propto\tau\alpha$, where $\alpha$ indicates the characteristic of the motion. The smaller $\alpha$ is, the more random or diffusive the motion is; while the larger $\alpha$ is, the more directed the motion is.

FIG. 9C(IV) shows a histogram showing a statistical comparison of vesicle instantaneous velocities recorded at 2 Hz and 100 Hz, respectively.

As described above, FIGS. 9B(I) to 9B(IV) illustrate three examples of vesicle transport dynamics: (I) moving back and forth along an MT, (II) rotating around an MT, and (III) colliding with other vesicles and then changing direction. These subtle and fast random walks are undetectable at low spatial resolution (see LR image 910 of FIG. 9C(I)) and low temporal resolution (see FIG. 9C(II), 2 Hz), which shows that vesicle movement is scale dependent. At the millisecond scale, thermal diffusion is dominant in vesicle movement (see FIG. 9C(III), 100 Hz, $\alpha$=0.25), and at the second scale, directed transport is dominant in vesicle movement (see FIG. 9C(III), 100 Hz, $\alpha$=1.2). At inadequate imaging speeds, the diffusive motions of vesicle movement would have been missed, as manifested by the distinct trajectories derived by the images taken at 2 Hz and 100 Hz shown in the MSD plot (see FIG. 9C(III); 2 Hz vs 100 Hz). Consequently, the actual instantaneous velocity of vesicles during transport, which is approximately 4 μm/s (see FIG. 9C(IV), 100 Hz), would have been substantially underestimated (estimated as ~0.5 μm/s in FIG. 9C(IV) at 2 Hz, which is in accordance with a previous report).

In addition to subtle diffusive motions of vesicles, FIGS. 9D(I)-9D(II) have investigated nondirected transport of vesicles, which has been reported in previous studies using single-particle tracking but was not fully explained.

FIGS. 9D(I) and 9D(II) depict embodiments where SR images reconstructed based on the SFSRM image processing approach of the present application are utilised to investigate microtubule dynamics resulting in non-directed transport of vesicles.

FIG. 9D(I) shows a plurality of SR images of microtubules and vesicles reconstructed based on LR images of the microtubules and vesicles taken at $0^{th}$ second, $0.03^{rd}$ second, $0.06^{th}$ second, $0.21^{st}$ second, $0.26^{th}$ second, $0.35^{th}$ second, and $0.72^{nd}$ second, respectively. In FIG. 9D(I), the plurality of the SR images show a transverse movement of a microtubule delivering the vesicles attached to it to a nearby microtubule, resulting in nondirected transport.

FIG. 9D(II) shows a plurality of SR images of microtubules and vesicles reconstructed based on LR images of the microtubules and vesicles taken at $0^{th}$ second, $0.09^{th}$ second, $0.57^{th}$ second, $0.78^{th}$ second, $1.02^{nd}$ second, $1.10^{th}$ second, and $1.15^{th}$ second, respectively. In FIG. 9D(II), the plurality of the SR images show that random fluctuation of surrounding microtubules facilitates the vesicles to switch to different microtubules, resulting in nondirected transport.

FIG. 9E depicts a box-and-whisker plot showing a statistical comparison of instantaneous velocities of directed and non-directed vesicle transports as shown in FIGS. 9D(I) and 9D(II) and their representative trajectories. It is indicated in FIG. 9E that nondirected movements have an approximately two-fold higher average instantaneous velocity and a four-fold broader range of distribution than directed movements, indicating that these displacements are likely related to MT fluctuations rather than motor-driven movement.

Since MTs are densely distributed, they provide tracks for vesicles. Additionally, intersections form and influence vesicle transport. Previous studies have shown that vesicles may pass, pause, switch or reverse at an intersection. In the present application, it is noticed that all vesicles eventually pass the studied intersections; however, the dwell time varied greatly and largely depended on the complexity of the intersection. Correspondingly, the intersections are classified into three groups/categories based on the number of MTs at each intersection.

Accordingly, FIGS. 9F(I), 9F(II) and 9F(III) depict embodiments where SR images reconstructed based on the SFSRM image processing approach of the present application are utilised to investigate vesicle transport dynamics at different types of microtubule intersections in a cell. Based on the number of microtubules involved, the microtubule intersections are classified into three categories, i.e., (I) 2 microtubules, (II) 3 to 5 microtubules, and (III) more than 5 microtubules.

FIG. 9F(I) shows that for the simplest intersections of two MTs, the vesicle can easily pass through by climbing over one MT, usually within two seconds; and the MT vibration is unlikely to interrupt vesicle transport.

FIG. 9F(II) shows that for intersections with 3-5 MTs, the vesicles tended to interfere with the dynamics of nearby MTs. Thus, if the surrounding MTs fluctuate severely, the vesicles are hindered, and the time needed to pass through one of these intersections ranged from several to ten seconds.

FIG. 9F(III) shows that for intersections involving more than 5 MTs tethered together, the vesicles were most likely to be trapped at the intersection until the fluctuations in the surrounding MTs became coordinated and the stellate intersection loosened.

However, coordinated fluctuations and intersection loosening are highly uncertain, and such processes may take tens of seconds to minutes. In this regard, FIG. 9G depicts a plot showing a statistical comparison of dwell time of the vesicles at the three categories of microtubule intersections and percentages of the vesicles in the cell via a pie chart.

The box-and-whisker plot of FIG. 9G shows that generally, the more complex the intersection is, the longer the resulting dwell time. For intersections involving more than 5 MTs, the dwell time could be longer than one minute. Fortunately, this kind of intersection only accounts for approximately 10% of all intersections in a cell, whereas more than half of the intersections consist of only 3-5 MTs, as shown in the pie chart of FIG. 9G.

SFSRM Image Processing Approach Utilised in Whole Genome Sequencing at High Throughput FIGS. 10A to 10D depict embodiments where SR images reconstructed based on the SFSRM image processing approach of the present application are utilised for in situ genome sequencing in an interphase human fibroblast nucleus.

The capacity to view genomes in situ, in their entirety and at high genomic resolution is becoming increasingly important. Previously fluorescence in situ hybridization (FISH) has combined with stochastic optical reconstruction microscopy (STORM) to provide the super-resolution image of genomic regions in the human fibroblast cell. However, to image ten to a few hundred cells per experiment, the imaging time is up to several hours. In contrast, the SFSRM image processing approach advantageously achieves an imaging speed up to 100 Hz, allowing it to image hundreds to thousands of cells per experiment with relatively negligible imaging time.

Figure 10A:
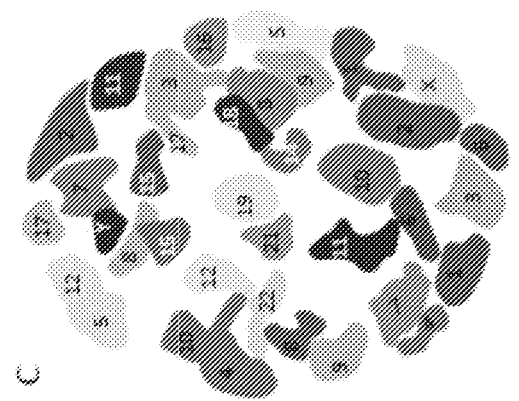
Figure 10B:
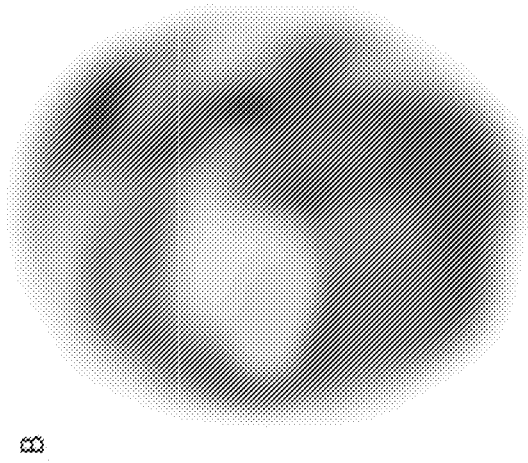
Figure 10C:
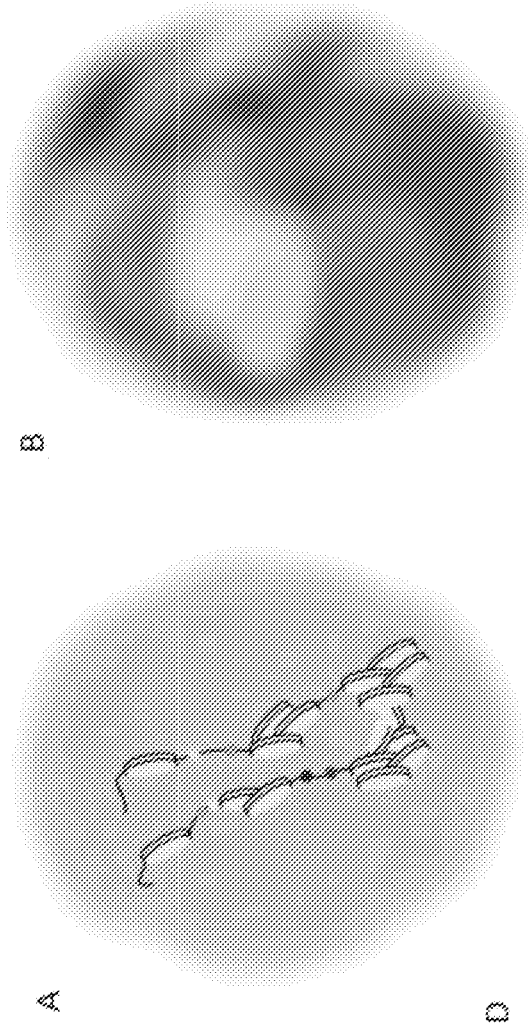
Figure 10D:
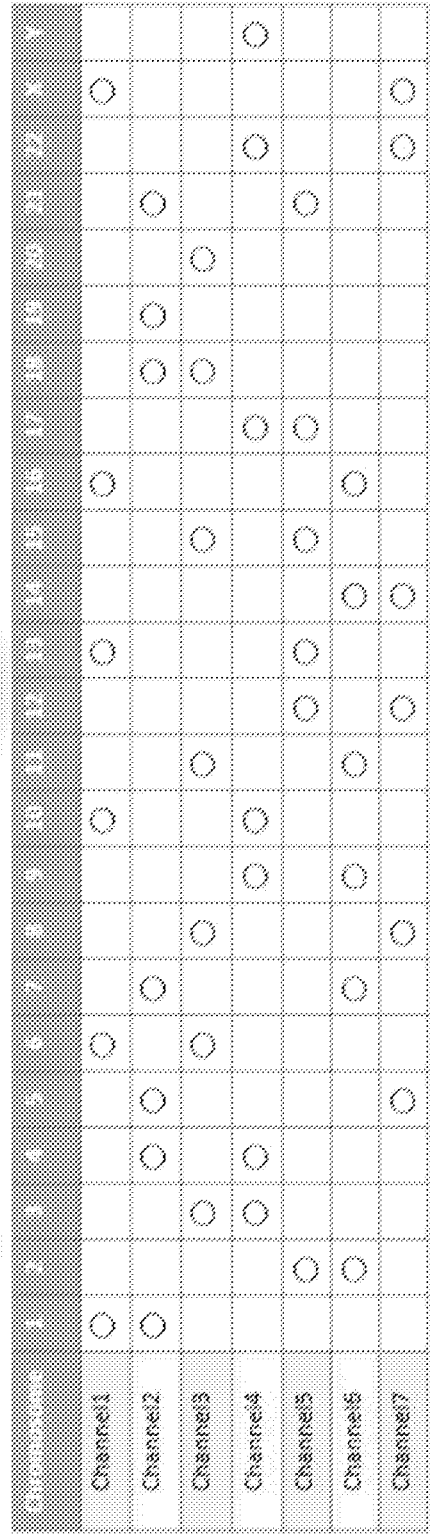

In this regard, FIG. 10A shows a fluorescence in situ hybridization (FISH) labeling of the genome of the interphase human fibroblast nucleus. FIG. 10B depicts a widefield LR image of the nucleus. FIG. 10C depicts a SR image of the nucleus reconstructed based on the SFSRM image processing approach of the present application. FIG. 10D depicts a table of chromosome sequences by different probe combinations.

SFSRM Image Processing Approach Utilised in Phenotype Profiling, and Drug Screening Based on Subcellular Morphologies FIGS. 11A to 11D depict embodiments where SR images reconstructed based on the SFSRM image processing approach of the present application are utilised for image-based phenotype profiling or drug screening.

FIG. 11A shows a schematic illustration of a plurality of organelles in a cell. FIG. 11B depicts SR images of some of the plurality of organelles reconstructed based on the SFSRM image processing approach of the present application. FIG. 11C depicts a schematic diagram in which the SR images are analysed to extract features of the plurality of organelles. FIG. 11D depicts a schematic diagram which maps the relationship between the features to obtain profiles of the plurality of organelles.

Image-based profiling has great potential in identifying disease-associated screenable phenotypes, understanding disease mechanisms and predicting a drug's activity, toxicity or mechanism of action. Since it is the least expensive among high-dimensional profiling techniques, and it inherently offers single-cell resolution, which can capture important heterogeneous cell behaviours, image-based profiling is becoming a more and more preferred approach. However, a meaningful profiling requires hundreds of assays. Traditional single-molecule localization microscope need over ten minutes to get one super-resolution image. Hence it is too time consuming to be applied to image-based profiling. Benefitting from the high-temporal resolution provided by the SFSRM image processing approach, the present application can achieve a high throughput super resolution imaging hence promote the development of image-based profiling.

FIG. 12 shows a block diagram of a computer system 1200 suitable for use as a device 100 for image processing as described herein.

The following description of the computer system/computing device 1200 is provided by way of example only and is not intended to be limiting.

As shown in FIG. 12, the example computing device 1200 includes a processor 1204 for executing software routines. Although a single processor is shown for the sake of clarity, the computing device 1200 may also include a multi-processor system. The processor 1204 is connected to a communication infrastructure 1206 for communication with other components of the computing device 1200. The communication infrastructure 1206 may include, for example, a communications bus, cross-bar, or network.

The computing device 1200 further includes a main memory 1208, such as a random access memory (RAM), and a secondary memory 1210. The secondary memory 1210 may include, for example, a hard disk drive 1212 and/or a removable storage drive 1214, which may include a magnetic tape drive, an optical disk drive, or the like. The removable storage drive 1214 reads from and/or writes to a removable storage unit 1218 in a well-known manner. The removable storage unit 1218 may include a magnetic tape, optical disk, or the like, which is read by and written to by removable storage drive 1214. As will be appreciated by persons skilled in the relevant art(s), the removable storage unit 1218 includes a computer readable storage medium having stored therein computer executable program code instructions and/or data.

In an alternative implementation, the secondary memory 1210 may additionally or alternatively include other similar means for allowing computer programs or other instructions to be loaded into the computing device 1200. Such means can include, for example, a removable storage unit 1222 and an interface 1220. Examples of a removable storage unit 1222 and interface 1220 include a removable memory chip (such as an EPROM or PROM) and associated socket, and other removable storage units 1222 and interfaces 1220 which allow software and data to be transferred from the removable storage unit 1222 to the computer system 1200.

The computing device 1200 also includes at least one communication interface 1224. The communication interface 1224 allows software and data to be transferred between computing device 1200 and external devices via a communication path 1226. In various embodiments, the communication interface 1224 permits data to be transferred between the computing device 1200 and a data communication network, such as a public data or private data communication network. The communication interface 1224 may be used to exchange data between different computing devices 1200 which such computing devices 1200 form part an interconnected computer network. Examples of a communication interface 1224 can include a modem, a network interface (such as an Ethernet card), a communication port, an antenna with associated circuitry and the like. The communication interface 1224 may be wired or may be wireless. Software and data transferred via the communication interface 1224 are in the form of signals which can be electronic, electromagnetic, optical or other signals capable of being received by communication interface 1224. These signals are provided to the communication interface via the communication path 1226.

Optionally, the computing device 1200 further includes a display interface 1202 which performs operations for rendering images to an associated display 1230 and an audio interface 1232 for performing operations for playing audio content via associated speaker(s) 1234.

As used herein, the term "computer program product" may refer, in part, to removable storage unit 1218, removable storage unit 1222, a hard disk installed in hard disk drive 1212, or a carrier wave carrying software over communication path 1226 (wireless link or cable) to communication interface 1224. Computer readable storage media refers to any non-transitory tangible storage medium that provides recorded instructions and/or data to the computing device 1200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 1200. Examples of transitory or non-tangible computer readable transmission media that may also participate in the provision of software, application programs, instructions and/or data to the computing device 1200 include radio or infra-red transmission channels as well as a network connection to another computer or networked device, and the Internet or Intranets including e-mail transmissions and information recorded on Websites and the like.

The computer programs (also called computer program code) are stored in main memory 1208 and/or secondary memory 1210. Computer programs can also be received via the communication interface 1224. Such computer programs, when executed, enable the computing device 1200 to perform one or more features of embodiments discussed herein. In various embodiments, the computer programs, when executed, enable the processor 1204 to perform features of the above-described embodiments. Accordingly, such computer programs represent controllers of the computer system 1200.

Software may be stored in a computer program product and loaded into the computing device 1200 using the removable storage drive 1214, the hard disk drive 1212, or the interface 1220. Alternatively, the computer program product may be downloaded to the computer system 1200 over the communications path 1226. The software, when executed by the processor 1204, causes the computing device 1200 to perform functions of embodiments described herein.

It is to be understood that the embodiment of FIG. 12 is presented merely by way of example. Therefore, in some embodiments one or more features of the computing device 1200 may be omitted. Also, in some embodiments, one or more features of the computing device 1200 may be combined together. Additionally, in some embodiments, one or more features of the computing device 1200 may be split into one or more component parts.

FIG. 13 shows an embodiment where the object comprises DNA nanorulers. As shown, FIG. 13 depicts a fraction of a LR image 1302 of a whole field-of-view of a plurality of DNA nanorulers, a fraction of a SR image 1304 of the plurality of DNA nanorulers reconstructed from the LR image 1302 based on the SFSRM image processing approach of the present application, a LR image 1306 of a zoom-in view on a single DNA nanoruler among the plurality of DNA nanorulers, a ground truth (GT) image 1308 of the single DNA nanoruler, and a SR image 1310 of the single DNA nanoruler reconstructed from the LR image 1306 based on the SFSRM image processing approach of the present application.

In this embodiment, the LR image 1306 is a WF fluorescence microscopy image of a whole field-of-view of a plurality of DNA nanorulers obtained from a Zeiss Elyra 7 microscope with HILO mode. The GT image 1308 is a STORM image reconstructed from 20,000 frames of single-molecule images of the single DNA nanoruler.

Diagrams 1312, 1314, 1316 depict intensity profiles along the dashed lines respectively shown in images 1306, 1308, 1310. The measured FWHM PSF size in the WF image 1306 is about 300 nm, and the measured distances between two spots in the STORM image 1308 and the SR image 1310 are 30 nm. Scale bar deployed is 1 μm in the whole field-of-view and 200 nm in the zoom-in view.

FIG. 14 shows a LR image 1402 of microtubules in a fixed cell, a ground truth (GT) image 1404 of the microtubules, and a SR image 1406 of the microtubules reconstructed from the LR image 1402 based on the SFSRM image processing approach of the present application.

In this embodiment, the LR image 1402 is a WF fluorescence microscopy image. The fixed cell is a Beas2B cell immunostained with Alexa Fluor 647. The GT image 1404 is a STORM image reconstructed from 20,000 frames of single-molecule images of the fixed cell.

FIG. 15 shows an embodiment where the object comprises mitochondria labelled with mitochondrial membrane protein Tomm20, endoplasmic reticulum (ER) labelled with ER membrane protein Sec61β, EGFR protein after EGF endocytosis, clathrin-coated-pits after EGF endocytosis, and expanded nuclear pore complex protein Nup133.

As shown, FIG. 15 in row 1502 depicts LR images of mitochondria labeled with the mitochondrial membrane protein Tomm20, endoplasmic reticulum (ER) labeled with the ER membrane protein Sec61β, EGFR protein after the EGF endocytosis, clathrin-coated-pits after the EGF endocytosis, and expanded nuclear pore complex protein Nup133 (The specimen was expanded for 2.5 times with expansion microscopy after immunostaining).

In this embodiment, the LR images in row 1502 are WF fluorescence microscopy images. The images are acquired from a Zeiss Elyra 7 microscope using HILO mode.

FIG. 15 in row 1504 depicts GT images of the mitochondria, the endoplasmic reticulum (ER), the EGFR protein, the clathrin-coated-pits, and the expanded nuclear pore, and in row 1506 depicts SR images of the mitochondria, the endoplasmic reticulum (ER), the EGFR protein, the clathrin-coated-pits, and the expanded nuclear pore reconstructed from the LR images based on the SFSRM image processing approach of the present application. The GT images are STORM images reconstructed from 20,000 frames of single-molecule images of the mitochondria, the endoplasmic reticulum (ER), the EGFR protein, the clathrin-coated-pits, and the expanded nuclear pore.

The techniques described in this specification produce one or more technical effects. As mentioned above, embodiments of the present application provide the image processing approaches that reconstruct a super resolution image from a single frame with a high detail accuracy.

More specifically, the image processing approaches of the present application provide a single frame super resolution (SR) microscopy (SFSRM) approach that reconstructs a SR image of single molecule resolution from a single fluorescence microscopy image without requiring multiple frames with single molecule fluorescence events. In this manner, the present application advantageously improves the speed of super resolution microscope and avoids the phototoxicity induced by high illuminance that is required to generate single-molecule excitation, thus pushes the limit of fluorescent microscopy to unprecedented spatiotemporal resolutions with a limited photon budget and circumvents possible trade-offs among the spatial resolution, imaging speed, and light dose.

In addition, the image processing approaches (e.g. the SFSRM approach) can advantageously accommodate various microscopy imaging systems such as wide-field fluorescence microscopy imaging, echo planar imaging (EPI), total internal reflection fluorescence (TIRF) microscopy imaging, confocal microscopy imaging, light sheet microscopy imaging, etc., which makes super resolution imaging possible for laboratories lacking advanced optical systems. The SFSRM approach has great potential in investigating subcellular processes that necessitate interpreting temporal dynamics in the context of ultrastructural information, which in turn advantageously open doors to new discoveries in live-cell imaging involving organelle dynamics and interaction, viral infection, cellular uptake and intracellular trafficking of nanoparticles, etc.

Moreover, the SFSRM approach can advantageously reconcile the conflict between high-resolution and high-throughput in any existing microscopy, making it suitable for large-scale, high-workload super resolution imaging such as whole-genome imaging, imaging-based assays of cell heterogeneity, phenotype profiling, and drug screening.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A computer-implemented method of image processing, the method comprising:
receiving a low resolution image of an object, wherein the low resolution image is a fluorescence microscopy image of the object;
generating an edge map of the low resolution image by an edge extractor, wherein the generating of the edge map comprises extracting the edge map by the edge extractor on a subpixel level based on a radial symmetry of fluorophore in the fluorescence microscopy image, an edge intensity at each subpixel being defined by an extent to which surrounding intensity gradients converge to the subpixel, the edge intensity being weighted by a pixel intensity of the subpixel; and
inputting the edge map and the low resolution image to a neural network to reconstruct a super resolution image of the object, wherein the neural network is trained using a multicomponent loss function.

2. The method according to claim 1, further comprising:
inputting the reconstructed super resolution image of the object and a ground true image of the object to the multicomponent loss function to quantify differences between the reconstructed super resolution image and the ground true image,
wherein the multicomponent loss function comprises one or more of a pixel-oriented loss function, a perceptual loss function, an adversarial loss function, and/or a frequency loss function.

3. The method according to claim 2, further comprising:
inputting the quantified differences between the reconstructed super resolution image and the ground true image to the neural network for subsequent training to optimize the neural network.

4. The method according to claim 2, wherein the pixel-oriented loss function comprises a multi-scale structure similarity (MS-SSIM) and L1-norm loss function.

5. The method according to claim 1, wherein the fluorescence microscopy image is a wide-field fluorescence microscopy image, a confocal microscopy image, a total internal reflection fluorescence (TIRF) microscopy image, or a light sheet microscopy image.

6. The method according to claim 1, wherein the object comprises intracellular structures of one or more cells.

7. The method according to claim 6, wherein the intracellular structures comprise one or more microtubules and/or organelles of the one or more cells.

8. The method according to claim 6, wherein the one or more cells comprise a live cell.

9. A device for image processing, the device comprising:
at least one processor; and
a memory including computer program code for execution by the at least one processor, the computer program code instructing the at least one processor to:
receive a low resolution image of an object, wherein the low resolution image is a fluorescence microscopy image of the object;

generate an edge map of the low resolution image by an edge extractor, wherein in generating the edge map, the edge extractor extracts the edge map on a subpixel level based on a radial symmetry of fluorophore in the fluorescence microscopy image, an edge intensity at each subpixel being defined by an extent to which surrounding intensity gradients converge to the subpixel, the edge intensity being weighted by a pixel intensity of the subpixel; and input the edge map and the low resolution image to a neural network to reconstruct a super resolution image of the object, wherein the neural network is trained using a multicomponent loss function.

10. The device according to claim 9, wherein the computer program code further instructs the at least one processor to:

input the reconstructed super resolution image of the object and a ground true image of the object to the multicomponent loss function to quantify differences between the reconstructed super resolution image and the ground true image, wherein the multicomponent loss function comprises one or more of a pixel-oriented loss function, a perceptual loss function, an adversarial loss function, and/or a frequency loss function.

11. The device according to claim 10, wherein the computer program code further instructs the at least one processor to:

input the quantified differences between the reconstructed super resolution image and the ground true image to the neural network for subsequent training to optimize the neural network.

12. The device according to claim 10, wherein the pixel-oriented loss function comprises a multi-scale structure similarity (MS-SSIM) and L1-norm loss function.

13. The device according to claim 9, wherein the fluorescence microscopy image is a wide-field fluorescence microscopy image, a confocal microscopy image, a total internal reflection fluorescence (TIRF) microscopy image, or a light sheet microscopy image.

14. The device according to claim 9, wherein the object comprises intracellular structures of one or more cells.

15. The device according to claim 14, wherein the intracellular structures comprise one or more microtubules and/or organelles of the one or more cells.

16. The device according to claim 14, wherein the one or more cells comprise a live cell.

17. A microscopy imaging system, comprising:
a fluorescence microscope to produce a low resolution image of an object, and
the device for microscopy image processing of the low resolution image according to claim 9, wherein the device is coupled to the fluorescence microscope.

18. A non-transitory computer readable storage medium having instructions encoded thereon that, when executed by a processor, cause the processor to perform one or more steps in the method for image processing according to claim 1.

* * * * *